(12) United States Patent
Teshima

(10) Patent No.: US 10,490,101 B2
(45) Date of Patent: Nov. 26, 2019

(54) WEARABLE DEVICE, DISPLAY CONTROL METHOD, AND COMPUTER-READABLE RECORDING MEDIUM

(71) Applicant: FUJITSU LIMITED, Kawasaki-shi, Kanagawa (JP)

(72) Inventor: Mamiko Teshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/589,309

(22) Filed: May 8, 2017

(65) Prior Publication Data

US 2017/0243519 A1   Aug. 24, 2017

Related U.S. Application Data

(63) Continuation of application No. PCT/JP2014/080000, filed on Nov. 12, 2014.

(51) Int. Cl.
| | |
|---|---|
| G09B 21/00 | (2006.01) |
| H04R 1/40 | (2006.01) |
| H04R 3/00 | (2006.01) |
| G02B 27/01 | (2006.01) |
| G06F 3/01 | (2006.01) |
| G06T 11/60 | (2006.01) |
| H04N 5/445 | (2011.01) |

(Continued)

(52) U.S. Cl.
CPC ....... *G09B 21/009* (2013.01); *G02B 27/0172* (2013.01); *G06F 3/013* (2013.01); *G06T 11/60* (2013.01); *G09B 21/00* (2013.01); *G10L 15/26* (2013.01); *H04N 5/44504* (2013.01); *H04N 5/44513* (2013.01); *H04R 1/40* (2013.01); *H04R 3/00* (2013.01); *H04R 3/005* (2013.01); *G02B 2027/014* (2013.01); *G10L 25/51* (2013.01); *H04N 2005/44526* (2013.01); *H04R 2430/20* (2013.01)

(58) Field of Classification Search
CPC ... G09B 21/009; G02B 27/0172; G06F 3/013; G06T 11/60; H04N 5/44504; H04N 5/44513
USPC ................. 345/619, 629, 632, 633
See application file for complete search history.

(56) References Cited

U.S. PATENT DOCUMENTS

| | | | |
|---|---|---|---|
| 2005/0075885 A1* | 4/2005 | Danieli | A63F 13/12 704/276 |
| 2007/0195012 A1 | 8/2007 | Ichikawa et al. | |

(Continued)

FOREIGN PATENT DOCUMENTS

| | | |
|---|---|---|
| JP | 11-136598 | 5/1999 |
| JP | 2005-99418 | 4/2005 |

(Continued)

OTHER PUBLICATIONS

Patent Abstracts of Japan, Publication No. 2012-133250, published Jul. 12, 2012.

(Continued)

*Primary Examiner* — Sarah Lhymn
(74) *Attorney, Agent, or Firm* — Staas & Halsey LLP

(57) ABSTRACT

A wearable device is provided that includes a microphone, a display, and a controller. The controller controls to identify a direction of emitted sound based on sound picked up by the microphone, and to display information corresponding to the sound at a position on the display corresponding to the identified direction of the emitted sound.

17 Claims, 26 Drawing Sheets

(51) Int. Cl.
*G10L 15/26* (2006.01)
*G10L 25/51* (2013.01)

(56) References Cited

U.S. PATENT DOCUMENTS

| | | | |
|---|---|---|---|
| 2011/0170067 A1* | 7/2011 | Sato | A61B 5/0496 351/209 |
| 2012/0162259 A1 | 6/2012 | Sakai | |
| 2013/0117377 A1* | 5/2013 | Miller | H04L 67/38 709/205 |
| 2013/0128364 A1* | 5/2013 | Wheeler | A61B 3/113 359/630 |
| 2014/0010391 A1* | 1/2014 | Ek | G06F 3/011 381/310 |
| 2014/0081634 A1 | 3/2014 | Forutanpour et al. | |
| 2016/0026242 A1* | 1/2016 | Burns | H04N 9/31 345/633 |

FOREIGN PATENT DOCUMENTS

| | | | |
|---|---|---|---|
| JP | 2007-334149 | | 12/2007 |
| JP | 2010-48851 | | 3/2010 |
| JP | 2012-59121 | | 3/2012 |
| JP | 2012059121 A | * | 3/2012 |
| JP | 2012-133250 | | 7/2012 |
| JP | 5286667 | | 9/2013 |
| WO | WO 2013/074234 A1 | | 5/2013 |
| WO | WO 2014/068832 A1 | | 5/2014 |

OTHER PUBLICATIONS

Patent Abstracts of Japan, Publication No. 5286667, published Sep. 11, 2013.
Patent Abstracts of Japan, Publication No. 11-136598, published May 21, 1999.
Patent Abstracts of Japan, Publication No. 2012-59121, published Mar. 22, 2012.
Patent Abstracts of Japan, Publication No. 2010-48851, published Mar. 4, 2010.
Patent Abstracts of Japan, Publication No. 2007-334149, published Dec. 27, 2007.
Patent Abstracts of Japan, Publication No. 2005-099418, published Apr. 14, 2005.
International Search Report dated Jan. 27, 2015 in corresponding International Application No. PCT/JP2014/080000.
Written Opinion of the International Searching Authority dated Jan. 27, 2015 in corresponding International Application No. PCT/JP2014/080000.
Office Action for Japanese Patent Application No. 2016-558499, dated Mar. 20, 2018.
Extended European Search Report dated Jun. 20, 2018 in corresponding European Patent Application No. 14905972.7.
Japanese Office Action dated Nov. 6, 2018 issued in corresponding Japanese Patent Application No. 2016-558499.
Office Action dated May 3, 2019 in related European Patent Application No. 14 905 972.7 (4 pages).

* cited by examiner

WEARABLE DEVICE, DISPLAY CONTROL METHOD, AND COMPUTER-READABLE RECORDING MEDIUM

CROSS-REFERENCE TO RELATED APPLICATION

This application is a continuation application of International Application No. PCT/JP2014/080000, filed Nov. 12, 2014, the disclosure of which is incorporated herein by reference in its entirety.

FIELD

Technology disclosed herein relates to a wearable device, a display control method, and a computer-readable recording medium.

BACKGROUND

Along with recent miniaturization and weight reduction of information processing devices, development has progressed in wearable devices capable of being worn on the person and carried around.

As an example of a wearable device, a head-mounted display has been described that is wearable on the head, for example, and displays an image output from a display device by projecting onto a half-mirror provided to glasses such that the image is superimposed on a scene in the field of view.

RELATED PATENT DOCUMENTS

Japanese Laid-Open Patent Publication No. H11-136598

Due to being worn on the body, wearable devices can be used in various situations in life without being aware of their presence. Moreover, due to operation of wearable devices incorporating operation methods corresponding to the position where worn, wearable devices are devices suitable as communication tools for disabled persons having a disability with some part of their bodies.

SUMMARY

An embodiment of technology disclosed herein is a wearable device including a microphone, a display, and a processor. The processor is configured to execute a process, the process including identifying a direction of emitted sound based on sound picked up by the microphone, and displaying information corresponding to the sound at a position on the display corresponding to the identified direction of the emitted sound.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
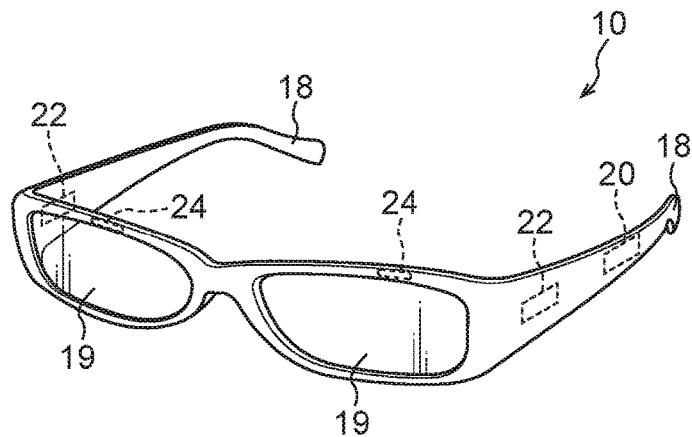
FIG. 1 is a diagram illustrating an example of a device according to a first exemplary embodiment.

Detailed explanation follows regarding examples of exemplary embodiments of technology disclosed herein, with reference to the drawings. Note that the same reference numerals are applied throughout the drawings to configuration elements and processing serving the same function, and redundant explanation thereof is sometimes omitted as appropriate.

First Exemplary Embodiment

FIG. 1 is a diagram illustrating an example of a wearable device according to a first exemplary embodiment.

As illustrated in FIG. 1, a wearable device 10 is a glasses-style terminal modeled in the shape of glasses and includes a processing device 20, microphones 22, and projectors 24. In the following, the wearable device 10 is sometimes denoted simply as device 10.

The microphones 22 are, for example, respectively built into portions of the device 10 at both the left and right temples 18 and pick up sound in the vicinity of the device 10. The microphones 22 respectively employ, for example, omnidirectional microphones, so as to enable sound generated in any direction to be picked up. Omnidirectional microphones are sometimes referred to as non-directional microphones.

The projectors 24 are, for example, respectively built into the frame of the device 10 at portions positioned above both left and right transparent members (for example, lenses) 19, and the projectors 24 display images. Specifically, the projectors 24 include red, green, and blue semiconductor lasers and mirrors; and display images by using the mirrors to reflect laser beams of the three primary colors of light shone from respective semiconductor lasers, such that the respective laser beams pass through the pupil and are scanned onto the retina in a two-dimensional pattern.

The strength of the laser beams employed in the projectors 24 is about 150 nW, this being a strength that meets the criteria of class 1 under the definitions of "Laser product emission safety standards" of Japanese Industrial Standards (JIS) C6802. Class 1 in JIS C6802 is a safety standard that satisfies the criterion of laser beams not causing damage to the retina even when viewed continuously without blinking for a duration of 100 seconds, and is a level not requiring any particular safety measures relating to laser beam emission.

Such retinal-scan type projectors 24 impart a lighter burden on the eye than when employing transmission type displays to display images, and also enable more vivid images to be displayed. Transmission type displays are, for example, transparent displays provided so as to be superimposed on the transparent members 19 and have a structure capable of displaying display images superimposed on a scene on the far side of the display. Known examples of transmission type displays include those that employ liquid crystal, or organic electroluminescence (EL).

Although explanation is given of a case in which the projectors 24 according to the first exemplary embodiment are retinal scanning type projectors, the projectors 24 may be retinal projector type projectors. Retinal projector type projectors have laser elements disposed for each pixel; and project images onto the retina by a method in which laser beams are emitted from each of the laser elements corresponding to the pixels within an image to be displayed, pass through the pupil, and are shone onto the retina. Transmission type displays may be employed in place of the projectors 24. The projectors 24 shine lasers onto the retinas of the user and display images at positions in the field of view of the user, enabling the retina of the user to be included in the display of technology disclosed herein.

The processing device 20 is, for example, built into a temple 18 of the device 10, and executes sound pick-up processing using the microphones 22 and display processing using the projectors 24. FIG. 1 illustrates an example in which the processing device 20 is built into the temple 18 on the left side of the device 10; however, there is no limitation to the position where the processing device 20 is disposed, and, for example, the processing device 20 may be divided and disposed so as to be distributed at plural locations in the device 10.

Figure 2:
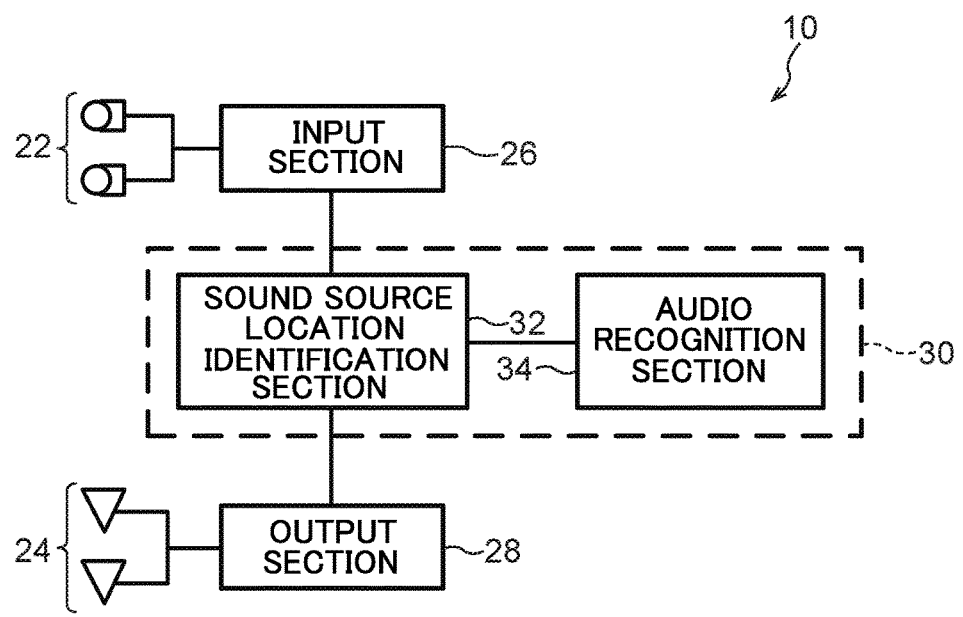
FIG. 2 is a functional block diagram illustrating an example of functionality of a device according to the first exemplary embodiment.

FIG. 2 is a functional block diagram illustrating functions of the device 10 according to the first exemplary embodiment as illustrated in FIG. 1.

The device 10 includes an input section 26, an output section 28, and a controller 30.

Electric signals representing sound picked up by the plural microphones 22 are each input to the input section 26. The input section 26 then amplifies each of the input electric signals, converts these into digital audio signals, and outputs the digital audio signals to the controller 30. When doing so, the input section 26 outputs to the controller 30 without deliberately delaying the audio signals. The digital audio signals representing sound are referred to simply as audio signals below.

The controller 30 controls the input section 26, and instructs the sampling timing of the audio signals. The controller 30 includes, for example, a sound source location identification section 32 and an audio recognition section 34, and employs audio signals notified through the input section 26 to identify the direction of the emitted sounds and to distinguish the types of sound represented by the audio signals. Moreover, when the type of sound is a human voice, the controller 30 analyzes what words were spoken in the audio signals, and executes processing to convert the speech content into text. The controller 30 then controls the output section 28, described later, so as to display information indicating the type of sound in the direction of the emitted sound.

The sound source location identification section 32 identifies the direction of emitted sound relative to the device 10 based on the plural audio signals. Specifically, the sound source location identification section 32 identifies the direction of emitted sound by computing the incident direction of sound from discrepancies in the input timing of audio signals input from each of the two microphones 22 built into the device 10, or from differences in the magnitude of the audio signals. Note that explanation is given here of an example in which the sound source location identification section 32 computes the incident direction of sound from discrepancies in the input timing of audio signals input from each of the two microphones 22 built into the device 10.

The sound source location identification section 32 outputs audio signals to the audio recognition section 34, orders the audio recognition section 34 to analyze the type of the sound and its speech content, and acquires the analysis results from the audio recognition section 34.

The audio recognition section 34 employs audio signals input from the sound source location identification section 32 to analyze the type of sound and the speech content therein. Reference here to the type of sound means information indicating what sound the emitted sound is, and is, for example, information indicating the specific type thereof, such as a human voice, vehicle traffic noise, the ringtone of an intercom, etc.

The controller 30 then controls the output section 28 so as to display, at a position in a display region of the projectors 24 corresponding to the direction of emitted sound identified by the sound source location identification section 32, at least one out of an icon indicating the type of sound, or the speech content therein, as distinguished by the audio recognition section 34.

The output section 28 employs the projectors 24 to display at least one out of an icon or the speech content as instructed by the controller 30 at a position instructed by the controller 30.

Figure 3A:
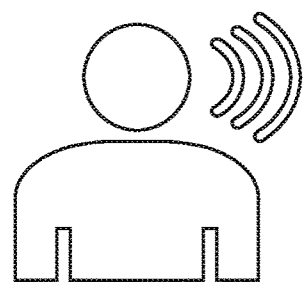
FIG. 3A is a diagram illustrating an example of an icon indicating a human voice.
Figure 3B:
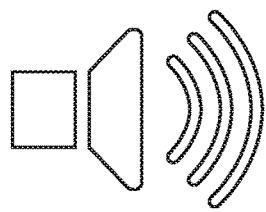
FIG. 3B is a diagram illustrating an example of an icon indicating the sound of a door chime.
Figure 3C:
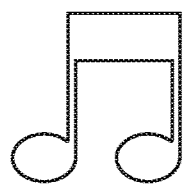
FIG. 3C is a diagram illustrating an example of an icon indicating a ringtone.
Figure 3D:
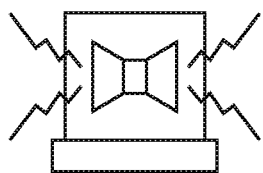
FIG. 3D is a diagram illustrating an example of an icon indicating the sound of a siren.
Figure 3E:
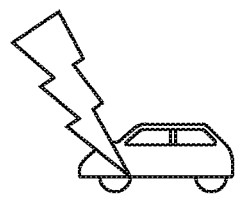
FIG. 3E is a diagram illustrating an example of an icon indicating a car horn.
Figure 3F:
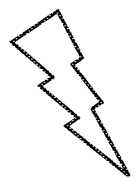
FIG. 3F is a diagram illustrating an example of an icon indicating the sound of thunder.
Figure 3G:
FIG. 3G is a diagram illustrating an example of an icon indicating vehicle traffic noise.
Figure 3H:
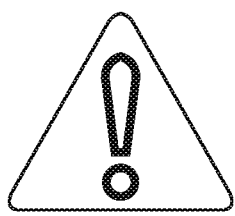
FIG. 3H is a diagram illustrating an example of an icon indicating sound needing attention.
Figure 3I:
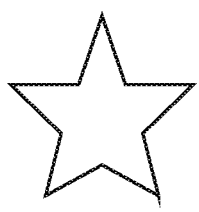
FIG. 3I is a diagram illustrating an example of an icon indicating sound registered by a user.

Examples of icons (also called pictograms) indicating the type of sound distinguished by the audio recognition section 34 are illustrated in FIG. 3A to FIG. 3I. The examples of icons indicate the sound of a human voice in FIG. 3A, the sound of a door chime in FIG. 3B, a ringtone of a cellular phone or the like in FIG. 3C, a siren in FIG. 3D, a vehicle horn in FIG. 3E, thunder in FIG. 3F, and vehicle traffic noise in FIG. 3G FIG. 3H is an example of an icon indicating some sort of sound that needs to be paid attention to emitted from a blind spot of the user. FIG. 3I is an example of an icon indicating a type of sound previously registered by a user.

A user of the device 10 (referred to below simply as "user") is able to register in the output section 28 an icon with a personalized shape, color, and size for a type of sound, such as the icon illustrated in FIG. 3I.

It goes without saying that the icons displayable on the output section 28 are not limited to the icons illustrated in FIG. 3A to FIG. 3I. The output section 28 is able to display icons corresponding to the types of sound distinguishable by the audio recognition section 34.

Since the icon illustrated in FIG. 3H is an icon prompting a user to pay attention, it is referred to in particular as an alert mark. The alert mark may be any design capable of prompting a user to pay attention, and, for example, as illustrated in FIG. 3H, a warning classification (an exclamation mark in the example of FIG. 3H) inside a black triangular border is employed therefor.

Figure 4:
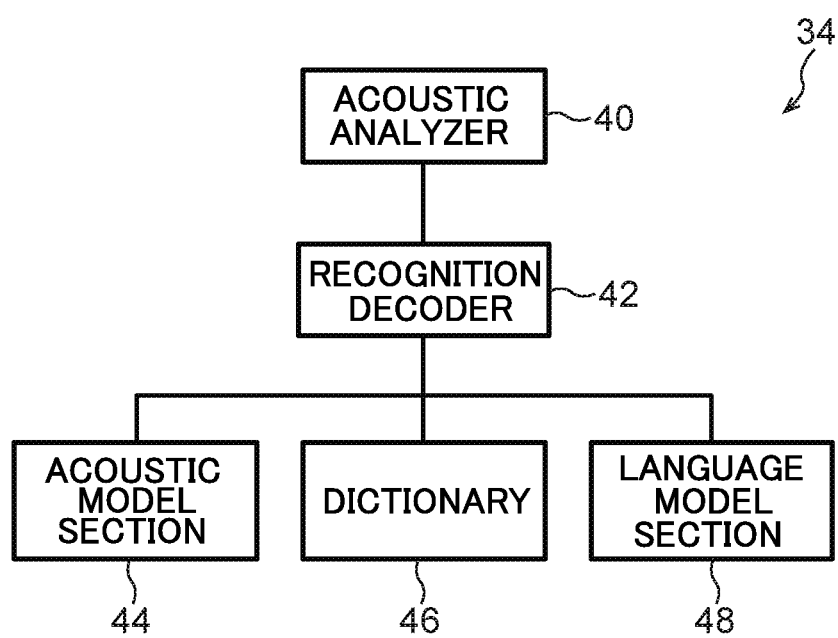
FIG. 4 is a functional block diagram illustrating an example of functionality of an audio recognition section.

Next, explanation follows regarding operation of the audio recognition section 34, with reference to FIG. 4.

As illustrated in FIG. 4, the audio recognition section 34 includes, for example, an acoustic analyzer 40, a recognition decoder 42, an acoustic model section 44, a dictionary 46, and a language model section 48.

The acoustic analyzer 40, for example, performs frequency analysis of the audio signals at predetermined time intervals, and acquires time series data of an acoustic spectrum indicating the loudness of sound for each frequency component.

The recognition decoder 42 includes functionality for identifying the types of sound represented by the audio signals from the time series data of the acoustic spectrum acquired by the acoustic analyzer 40, and also, when the type of sound represented by the audio signals is a human voice, functionality for recognizing the speech content in the audio signals and converting the speech content into text. When doing so, the recognition decoder 42 proceeds with processing in cooperation with the acoustic model section 44, the dictionary 46, and the language model section 48.

The acoustic model section 44 compares feature amounts of the various types of acoustic spectra of sound registered in advance in the dictionary 46 against the acoustic spectrum (recognition target spectrum) acquired by the acoustic analyzer 40, and selects from the dictionary 46 an acoustic spectrum that is similar to the recognition target spectrum. The acoustic model section 44 then takes the type of sound corresponding to the selected acoustic spectrum as the type of sound represented by the recognition target spectrum.

Moreover, based on the instructions of the recognition decoder 42, when the type of sound of the recognition target spectrum is a human voice, the acoustic model section 44 assigns sounds of speech against the recognition target spectrum. Specifically, the acoustic model section 44 compares feature amounts of acoustic spectra representing sounds of speech registered in advance in the dictionary 46 against feature amounts of the recognition target spectrum, and selects from the dictionary 46 the acoustic spectrum of sounds of speech that is most similar to the recognition target spectrum.

Based on the instructions of the recognition decoder 42, the string of sounds of speech corresponding to the recognition target spectrum obtained by the acoustic model section 44 is converted by the language model section 48 into a natural sentence that does not feel strange. For example, words are selected from words registered in advance in the dictionary 46 so as to follow the flow of sounds of speech according to a statistical model; and the linking between words, and the position of each word are determined and converted into a natural sentence.

There is no limitation to the language processing model employed in the acoustic model section 44 and the language model section 48 and, for example, a known language processing model, such as a hidden Markov model, may be employed.

Figure 5:
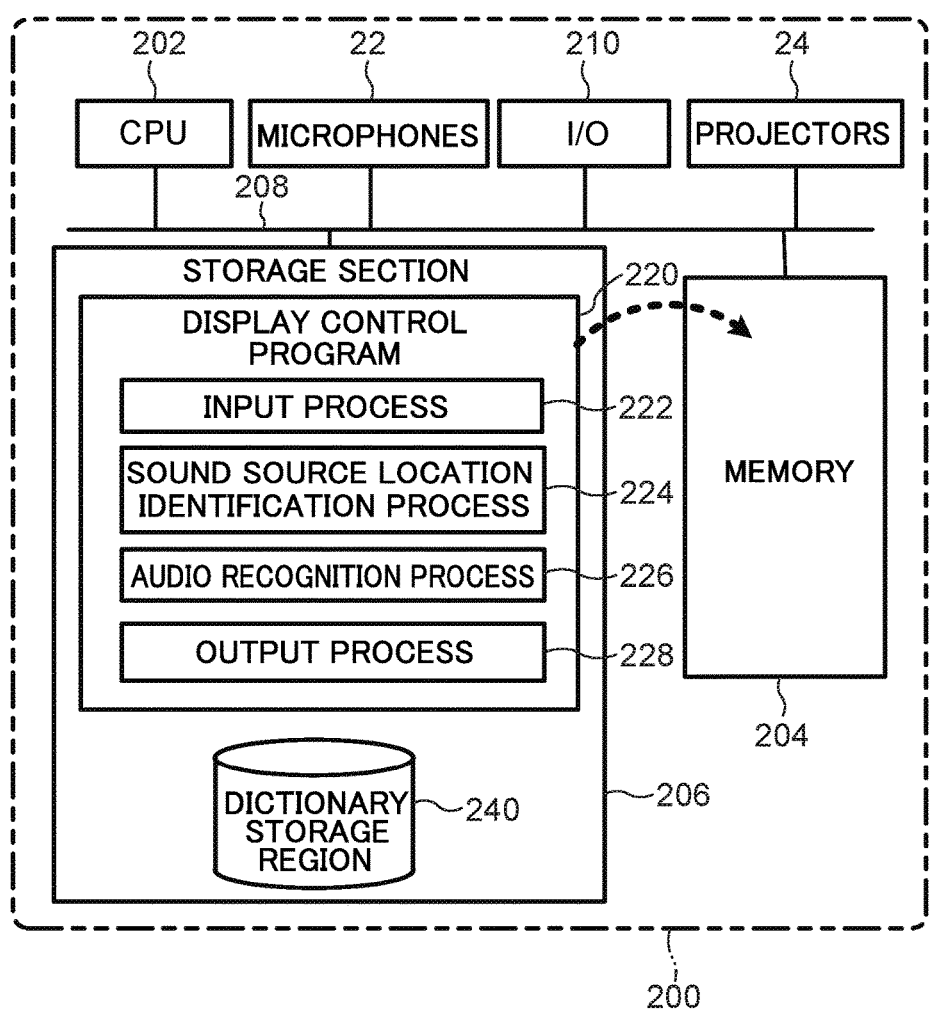
FIG. 5 is a diagram illustrating an example of a configuration when a device according to the first exemplary embodiment is implemented by a computer.

Next, a case in which each of the functional sections of the device 10 are implemented by a computer is illustrated in the configuration diagram of FIG. 5.

A computer 200 includes a CPU 202, memory 204, and a non-volatile storage section 206. The CPU 202, the memory 204, and the non-volatile storage section 206 are mutually connected through a bus 208. The computer 200 is equipped with the microphones 22 and the projectors 24, and the microphones 22 and the projectors 24 are connected to the bus 208. The computer 200 is also equipped with an I/O 210 for reading and writing to a recording medium, and the I/O 210 is also connected to the bus 208. The storage section 206 may be implemented by a hard disk drive (HDD), flash memory, or the like.

A display control program 220 for causing the computer 200 to function as each of the functional sections of the device 10 illustrated in FIG. 2 is stored in the storage section 206. The display control program 220 stored in the storage section 206 includes an input process 222, a sound source location identification process 224, an audio recognition process 226, and an output process 228.

The CPU 202 reads the display control program 220 from the storage section 206, expands the display control program 220 into the memory 204, and executes each of the processes of the display control program 220.

By reading the display control program 220 from the storage section 206, expanding the display control program 220 into the memory 204, and executing the display control program 220, the CPU 202 causes the computer 200 to operate as each of the functional sections of the device 10 illustrated in FIG. 2. Specifically, the computer 200 is caused to operate as the input section 26 illustrated in FIG. 2 by the CPU 202 executing the input process 222. The computer 200 is caused to operate as the sound source location identification section 32 illustrated in FIG. 2 by the CPU 202 executing the sound source location identification process 224. The computer 200 is caused to operate as the audio recognition section 34 illustrated in FIG. 2 by the CPU 202 executing the audio recognition process 226. The computer 200 is caused to operate as the output section 28 illustrated in FIG. 2 by the CPU 202 executing the output process 228. The computer 200 is caused to operate as the controller 30 illustrated in FIG. 2 by the CPU 202 executing the sound source location identification process 224 and the audio recognition process 226.

Moreover, the computer 200 includes the dictionary 46 illustrated in FIG. 4 by the CPU 202 expanding dictionary data included in a dictionary storage region 240 into the memory 204.

Each of the functional sections of the device 10 may be implemented by, for example, a semiconductor integrated circuit, or more specifically, by an Application Specific Integrated Circuit (ASIC).

Next, explanation follows regarding operation of the device 10 according to the first exemplary embodiment. The device 10 according to the first exemplary embodiment executes speech-to-caption processing after the device 10 starts up. The speech-to-caption processing is processing to convert into text (caption) the speech content of a speaker, and to display the speech content of the speaker superimposed on the field of view by shining lasers from the projectors 24 onto the retinas so as to display captioned text.

Figure 6:
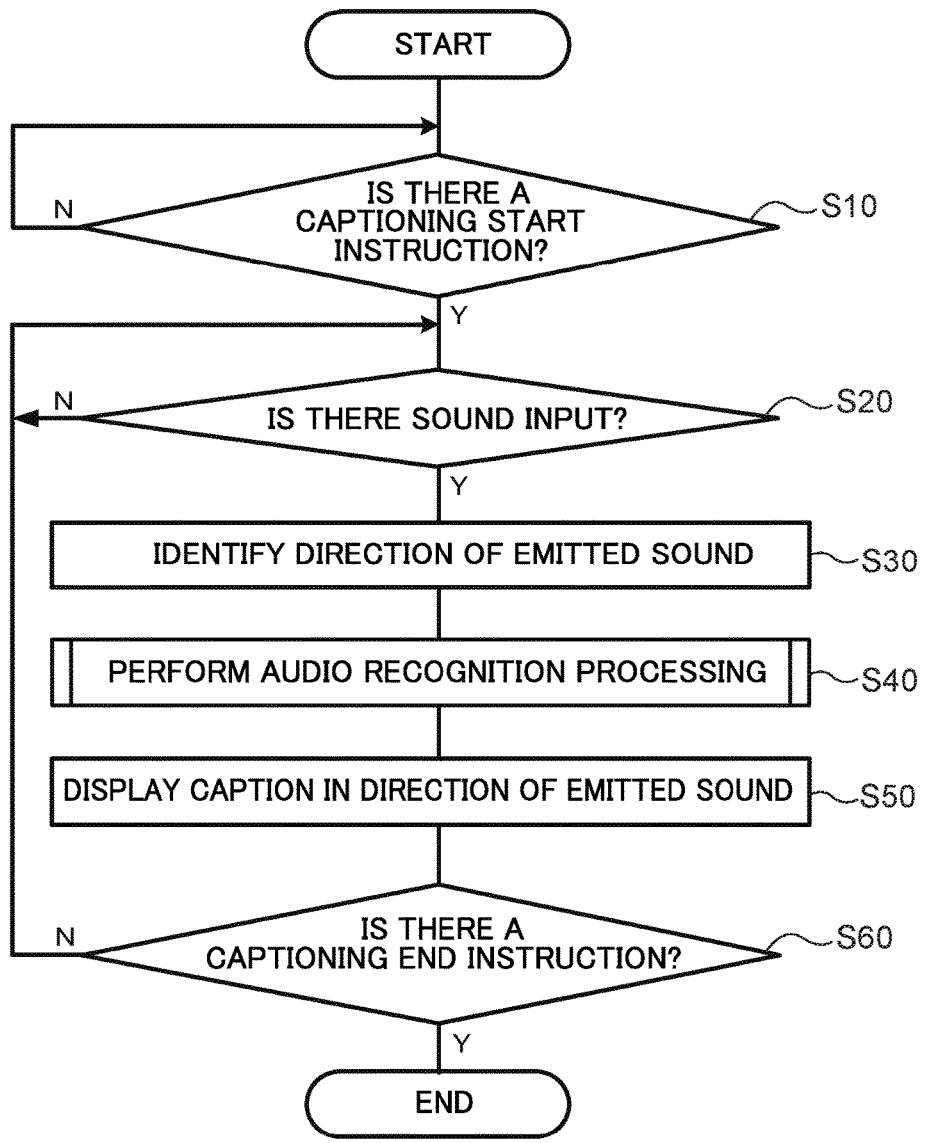
FIG. 6 is a flowchart illustrating an example of flow of speech-to-caption processing.

FIG. 6 is a flowchart illustrating an example of a flow of speech-to-caption processing of the device 10 according toward the first exemplary embodiment.

First, at step S10, the input section 26 determines whether or not a captioning start instruction has been received. A captioning start instruction is, for example, given by operating a button or the like, not illustrated in the drawings, provided to the device 10. When determination is negative, namely, when no captioning start instruction has been received, the processing of step S10 is repeated until a captioning start instruction is received. However, when determination is affirmative, namely, when a captioning start instruction has been received, processing transitions to step S20.

At step S20, the input section 26 picks up sound emitted in the vicinity of the device 10 using the microphones 22 respectively built into the left and right temples 18. The input section 26 then determines whether or not any sound has been emitted; and when determination is negative, the input section 26 repeats the processing of step S20 until some sound is picked up. However, when determination is affirmative, the respective audio signals from each of the sounds picked up by the respective microphones 22 are output to the sound source location identification section 32 and processing transitions to step S30.

As the method of determining whether or not any sound has been emitted, for example, a method may be employed that determines some sound has been emitted when the sound picked up by at least one of the microphones 22 reaches a predetermined sound level or greater; however, there is no limitation thereto.

At step S30, the sound source location identification section 32 computes the incident angle of a sound with respect to the device 10 from discrepancies in the arrival timing of each of the audio signals notified from the input section 26. For example, the sound source location identification section 32 computes the incident angle of a sound by referencing discrepancies in input timing of the audio signals input from the respective microphones 22 against an incident angle computation table associating incident angles with a three-dimensional coordinate space having the position of the device 10 as the origin. The sound source location identification section 32 may compute the incident angle of a sound by referencing differences in magnitude of audio signals respectively input from the microphones 22 against an incident angle computation table associating incident angles with a three-dimensional coordinate space having the position of the device 10 as the origin.

Note that the incident angles corresponding to the combinations of discrepancies in arrival timing of the audio signals or to the combinations of differences in magnitude of the audio signals may be found in advance by experimentation using the actual device 10, by computer simulation based on the design specification of the device 10, or the like. The incident angle computation table may, for example, be pre-stored in a predetermined region of the memory 204.

In this manner, the sound source location identification section 32 is able to identify the direction of emitted sound with better precision the further away the respective microphones 22 are separated from each other due to identifying the direction of emitted sound from the discrepancies in arrival timing of the audio signals. Thus, the respective positions of the microphones 22 in the device 10 are preferably disposed so as to be displaced from each other in the height direction, the front-rear direction, and the left-right direction of the device 10. When the device 10 is worn on the head, the height direction of the device 10 is the up-down direction and the front-rear direction of the device 10 is a direction orthogonal to the plane of incidence of light to the transparent members 19. The left-right direction of the device 10 is a direction orthogonal to both the height direction and the front-rear direction of the device 10.

The sound source location identification section 32 then notifies the audio signals to the audio recognition section 34, and instructs the audio recognition section 34 to caption the speech content represented by the audio signals.

At step S40, the audio recognition section 34 executes audio recognition processing, and captions the speech content represented by the audio signals.

Figure 7:
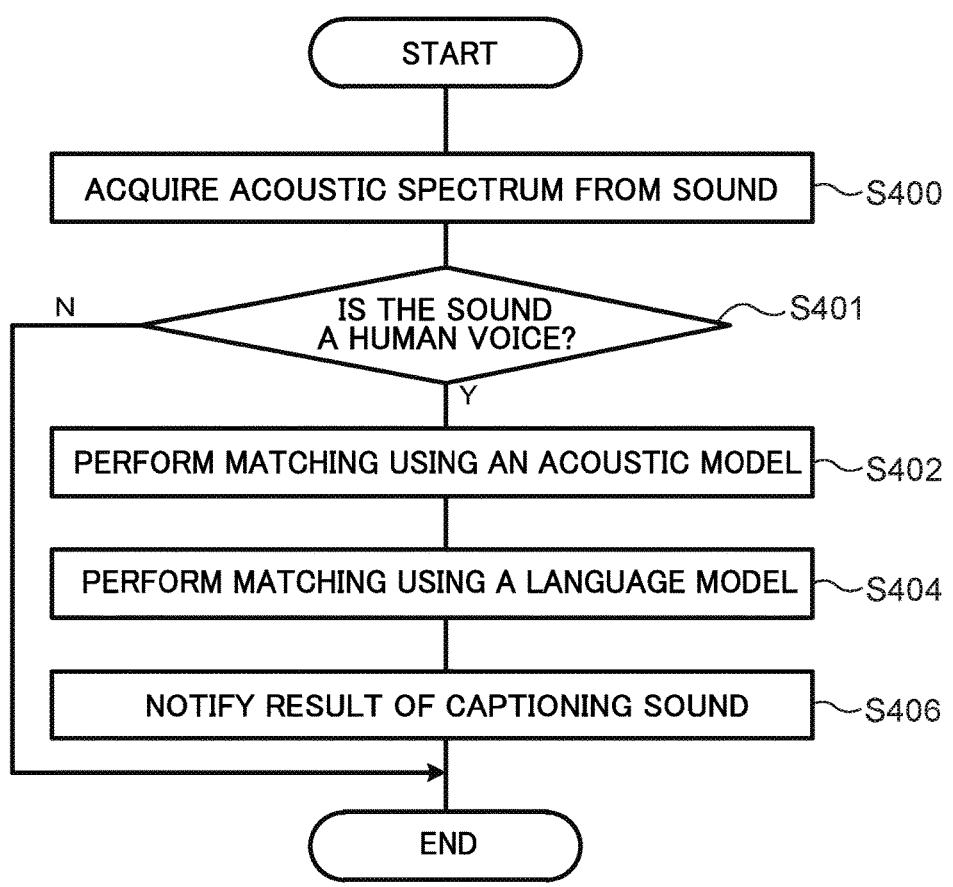
FIG. 7 is a flowchart illustrating an example of flow of audio recognition processing.

FIG. 7 is a flowchart illustrating an example of flow of the audio recognition processing executed by the processing of step S40.

First, at step S400, the acoustic analyzer 40 performs, for example, frequency analysis on the audio signals at predetermined time intervals and acquires time series data of an acoustic spectrum indicating the loudness of sound for each frequency component.

Next, at step S401, the recognition decoder 42 notifies the acoustic model section 44 with the acoustic spectrum acquired in the processing at step S400, namely, the time series data of the recognition target spectrum. The recognition decoder 42 then instructs the acoustic model section 44 to identify the type of sound corresponding to the recognition target spectrum. The method of identifying the type of sound in the acoustic model section 44 will be explained later. The recognition decoder 42 determines whether or not the type of sound corresponding to the recognition target spectrum identified in the acoustic model section 44 is a human voice and ends the speech-to-caption processing when determination is negative. However, processing transitions to step S402 when determination is affirmative.

At step S402, the recognition decoder 42 instructs the acoustic model section 44 to assign sounds of speech to the recognition target spectrum identified as a human voice.

The acoustic model section 44 compares feature amounts of acoustic spectra representing sounds of speech registered in advance in the dictionary 46 against feature amounts of the recognition target spectrum, and selects, from the dictionary 46, the acoustic spectrum of sounds of speech that is most similar to the recognition target spectrum. The acoustic model section 44 thereby assigns sounds of speech against the recognition target spectrum, and notifies the assignment result to the recognition decoder 42.

At step S404, when notified with the result of sounds of speech assignment from the acoustic model section 44, the recognition decoder 42 notifies the sounds of speech assignment result to the language model section 48. The recognition decoder 42 then instructs the language model section 48 to convert the sounds of speech assignment result into a natural sentence that does not feel strange.

For example, the language model section 48 selects words from words registered in advance in the dictionary 46 so as to follow the flow of sounds of speech according to a statistical model, probabilistically determines the linking between words and the position of each word, and converts the words into a natural sentence. The language model section 48 thereby converts the string of sounds of speech corresponding to the recognition target spectrum into a natural sentence that does not feel strange, and notifies the conversion result to the recognition decoder 42.

At step S406, the recognition decoder 42 notifies the sound source location identification section 32 with the speech content of the speaker, captioned by the processing of step S404.

Thus, the audio recognition process of step S40 illustrated in FIG. 6 is executed by performing the processing of each of steps S400 to S406.

Then, at step S50 illustrated in FIG. 6, the sound source location identification section 32 instructs the output section 28 to display the direction of emitted sound identified by the processing of step S30, and the captioned speech content acquired by the processing of step S40.

When a display instruction is received from the sound source location identification section 32, the output section 28 employs the projectors 24 to display the captioned speech content at a position within the field of view corresponding to the direction of the emitted sound.

At step S60, the input section 26 then determines whether or not a captioning end instruction has been received. A captioning end instruction is, for example, given by operating a button or the like, not illustrated in the drawings, provided to the device 10, similarly to the captioning start instruction. When determination is negative, processing transitions to step S20, and the speech-to-caption processing is continued by ongoing repetition of the processing of steps S20 to S60. However, the speech-to-caption processing illustrated in FIG. 6 is ended when determination is affirmative.

Caption display is updated in the output section 28 by processing to erase captions after a predetermined period of time has elapsed since being displayed, to remove previously displayed captions at a timing when a new caption is to be displayed, or the like.

Figure 8:
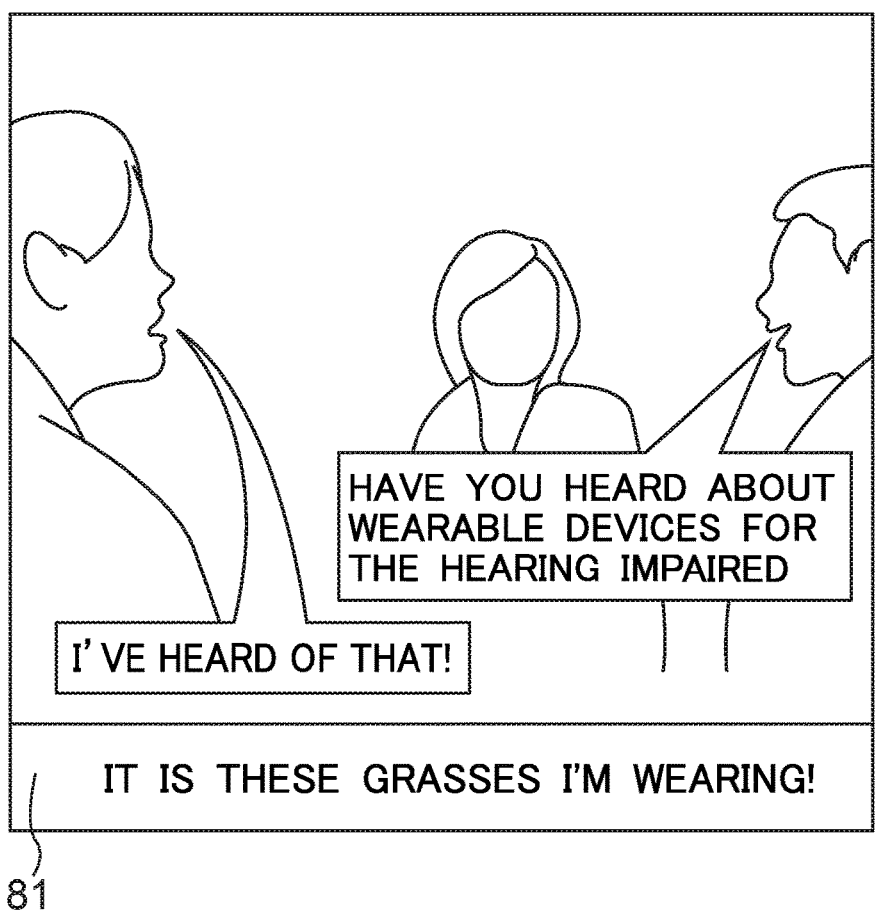
FIG. 8 is a diagram illustrating an example of caption display.

FIG. 8 is a diagram illustrating an example of captions displayed in the field of view of a user when the speech-to-caption processing illustrated in FIG. 6 has been executed.

As illustrated in FIG. 8, an image in which captions shone from the projectors 24 are superimposed over the scene visible through the transparent members 19 is displayed in the field of view of the user. When this is performed, a hearing impaired person is capable of comprehending the speaker and nature of the speech due to displaying the caption in the direction of the emitted sound.

Note that as illustrated in FIG. 8, the captions may be displayed in speech bubbles. In such cases, the speaker can be more easily ascertained than in cases in which captions are simply displayed at positions corresponding to the direction of the emitted sound.

Moreover, the characteristics of an acoustic spectrum of a speaker may be stored and the stored acoustic spectrum and the recognition target spectrum compared by the audio recognition section 34 to identify the speaker, so as to display captions in a color that varies according to the speaker. Moreover, the different frequency components included in voices for male voices and female voices may be utilized to determine the gender of the speaker so as to display captions in a color that varies such that, for example, the caption is black when the voice is determined to be that of a male, and the caption is red when the voice is determined to be that of a female.

The loudness of sound may be computed in the audio recognition section 34 from the recognition target spectrum so as to change the size of the text of the caption depending on the loudness of the sound. For example, the user is able to ascertain the loudness of sound visually by making a larger size of text of the captions corresponding to the sound as the loudness of sound gets louder.

Moreover, as explained in the processing of step S10 and step S60 of FIG. 6, the user is able to instruct the device 10 to start or stop the speech-to-caption processing according to their own determination. Thus, since the user is able to switch the operation of speech-to-caption processing according to the situation of the user, such as starting the speech-to-caption processing during a meeting and stopping speech-to-caption processing when the user wishes to concentrate on work, the annoyance of displaying unnecessary speech as captions in the field of view of a user can be reduced.

Moreover, the speech-to-caption processing of the device 10 is not only able to caption the speech content of other persons in the vicinity of a user, but is also able to caption the speech content of the user themselves. In such cases, the acoustic spectrum of the user is registered in advance in the dictionary 46 so as to be able to determine whether or not the speaker is the user by determining the degree of similarity between the recognition target spectrum and the acoustic spectrum of the user using the audio recognition section 34.

Captions representing speech content of the user differ from captions representing speech content of other persons and are, for example, displayed in a region 81 provided at the bottom of the field of view, as illustrated in FIG. 8. Since it is difficult for the hearing impaired to recognize their own voices, sometimes the intonation and pronunciation of words uttered by the hearing impaired differ from that of voices of able-bodied persons, and so conceivably, the intended content is not able to be conveyed to the other party.

However, due to the device 10 being able to caption words uttered by a user and display the uttered words in the region 81, the user is able to confirm by eye how their uttered words are being heard by the other party. The user is accordingly able to train to achieve a pronunciation that is closer to correct pronunciation. Moreover, due to the caption representing the speech content of the user being displayed in a different position to the captions representing the speech content of other persons, the speech content uttered by the user themselves can be readily confirmed.

Note that in cases in which, for example, a user does not need to confirm the speech content they themselves have uttered, the captions representing the speech content of the user can be set so as not to be displayed in the region 81 by a setting of the device 10. Not displaying the captions representing the speech content of the user enables the number of captions displayed in the field of view of the user to be suppressed.

Moreover, the device 10 according to the first exemplary embodiment executes situation notification processing after the device 10 starts up. The situation notification processing is processing to notify the user of the type and emitted direction of sound emitted in the vicinity of the user.

Figure 9:
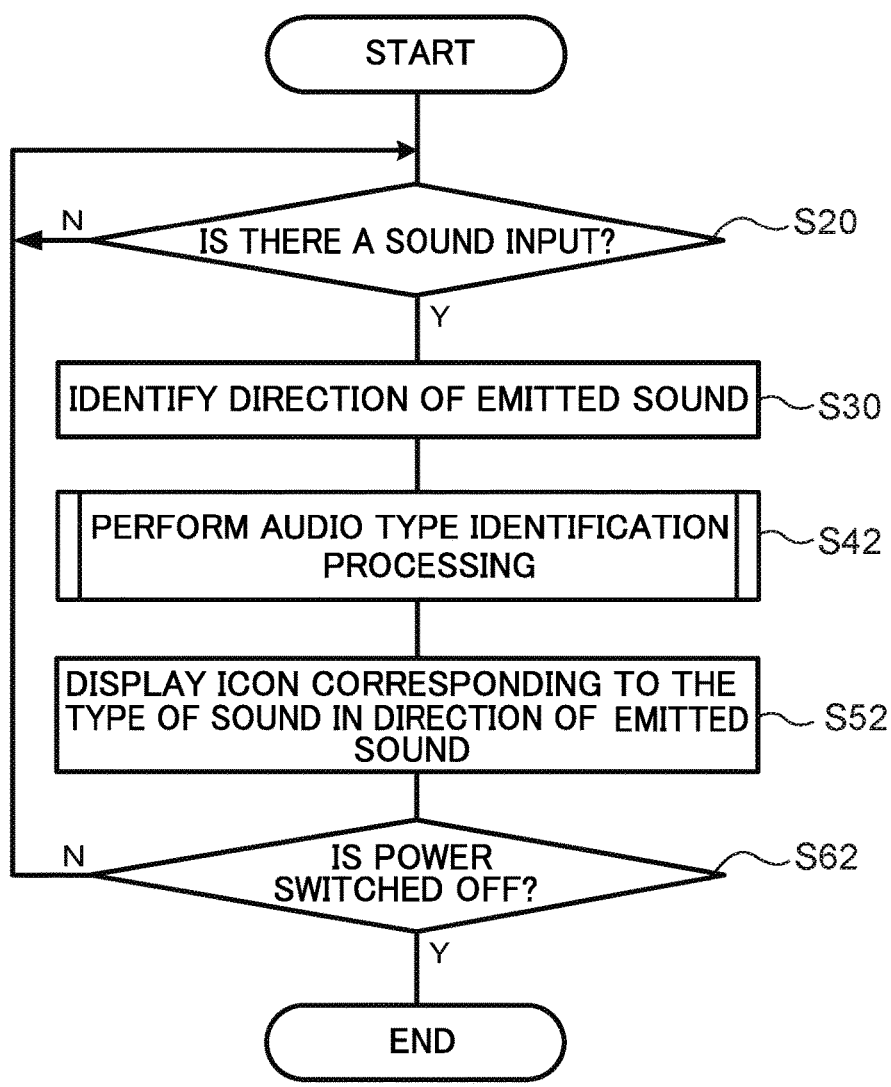
FIG. 9 is a flowchart illustrating an example of flow of situation notification processing.

FIG. 9 is a flowchart illustrating an example of a flow of situation notification processing of the device 10 according to the first exemplary embodiment.

Similar processing is performed at step S20 and step S30 to the processing of step S20 and step S30 of the speech-to-caption processing illustrated in FIG. 6. However, for the situation notification processing, at step S30, the sound source location identification section 32 instructs the audio recognition section 34 to identify the type of sound represented by the audio signals instead of instructing captioning of the speech content represented by the audio signal.

At step S42, the audio recognition section 34 executes audio type identification processing to identify the type of sound represented by the audio signal.

Figure 10:
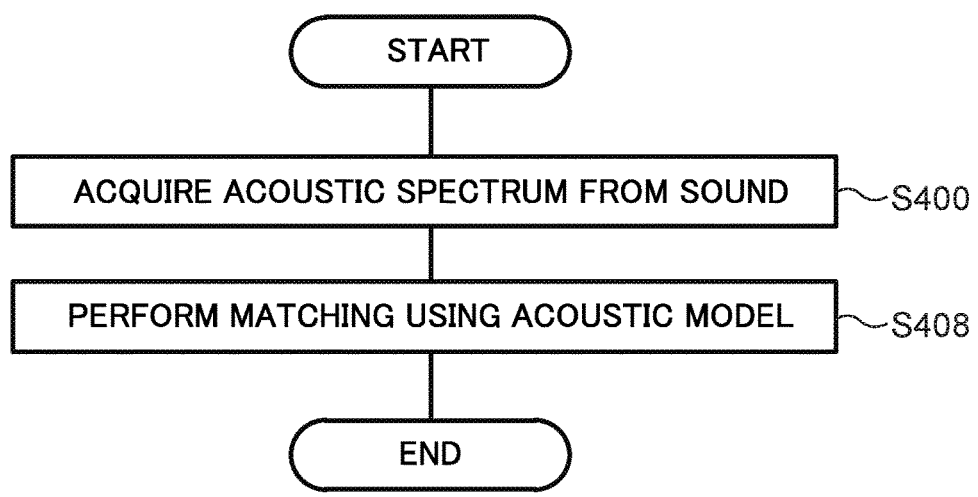
FIG. 10 is a flowchart illustrating an example of flow of audio type identification processing.

FIG. 10 is a flowchart illustrating an example of a flow of audio type identification processing executed by the processing of step S42.

First, processing is performed at step S400 similar to the processing of step S400 of FIG. 7, and time series data of the recognition target spectrum is acquired.

Next, at step S408, the recognition decoder 42 notifies the acoustic model section 44 of the time series data of the recognition target spectrum acquired by the processing of step S400. The recognition decoder 42 then instructs the acoustic model section 44 to identify the type of sound corresponding to the recognition target spectrum.

The acoustic model section 44 compares feature amounts of the recognition target spectrum against those of the various types of acoustic spectra registered in advance in the dictionary 46 and selects from the dictionary 46 an acoustic spectrum that is similar to the recognition target spectrum. The acoustic model section 44 then identifies the type of sound corresponding to the selected acoustic spectrum as the type of sound represented by the recognition target spectrum and notifies the recognition decoder 42 of the identification result. The degree of similarity between the feature amounts of the acoustic spectra and the feature amount of the recognition target spectrum may, for example, be represented by a numerical value that increases in value as the two feature amounts become more similar, and, for example, the two feature amounts are determined to be similar when the numerical value is a predetermined threshold value or greater.

On receipt of the identification result, the recognition decoder 42 then notifies the sound source location identification section 32 of the type of sound.

Thus, the audio type identification processing of step S42 illustrated in FIG. 9 is executed by performing the processing of each of step S400 and step S408.

Then at step S52 illustrated in FIG. 9, the sound source location identification section 32 instructs the output section 28 to display the direction of emitted sound identified by the processing of the step S30, and the icon indicating the type of sound identified by the processing of step S42.

On receipt of the display instruction from the sound source location identification section 32, the output section 28 acquires the icon corresponding to the specified type of sound from, for example, a predetermined region of the memory 204. The output section 28 then displays the icon at a position corresponding to the direction of the emitted sound in the field of view of the user using the projectors 24.

At step S62, the input section 26 then determines whether or not the power of the device 10 has been switched OFF. The ON/OFF state of the power can, for example, be acquired from the state of a button or the like, not illustrated in the drawings, provided to the device 10. Processing transitions to step S20 in cases in which negative determination is made, and the situation notification processing is continued by ongoing repetition of the processing of steps S20 to S62. However, the situation notification processing illustrated in FIG. 9 is ended in cases in which affirmative determination is made.

The icon display is updated by performing processing in the output section 28 to erase icons after a predetermined period of time has elapsed since being displayed, to remove previously displayed icons at a timing when a new icon is to be displayed, or the like.

Figure 11:
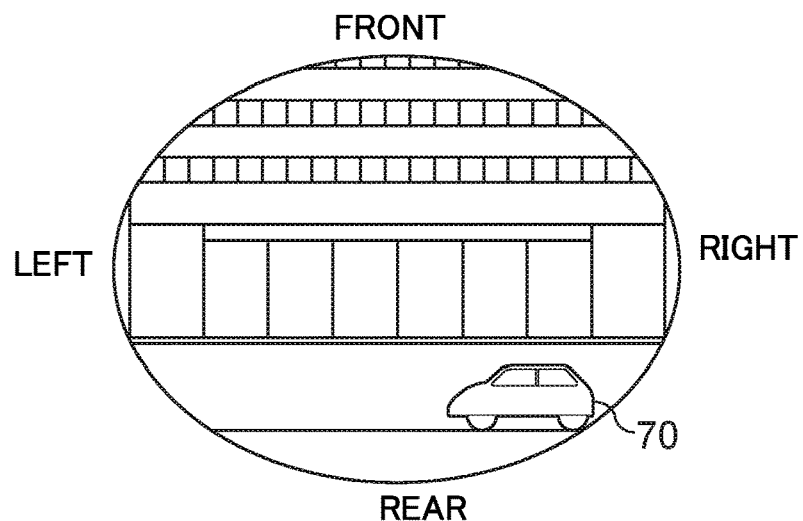
FIG. 11 is a diagram illustrating an example of icon display.

FIG. 11 is a diagram illustrating an example of an icon displayed in the field of view of a user when the situation notification processing illustrated in FIG. 9 has been executed. Note that for ease of explanation, in FIG. 11, the range of the field of view of the user is illustrated by an elliptical shape as an example.

For example, as illustrated in FIG. 11, if the top of the field of view is assigned as "front", the bottom of the field of view is assigned as "rear", the right of the field of view is assigned as "right", the left of the field of view is assigned as "left", and vehicle traffic noise is present at the right rear of the user; the output section 28 displays the icon 70 representing the vehicle traffic noise at the bottom right of the field of view. In this manner, the user can, for example, thereby take action, such as moving out of the way to the left side.

Note that the text for each of "front", "rear", "right", and "left" indicating the direction of emitted sound in FIG. 11 may be displayed so as to be superimposed on the field of view.

Moreover, for a case in which the directions front, rear, left, and right are assigned as in FIG. 11, when, for example, some sort of sound can be heard from above the user, the color of an icon can be changed to a color indicating that the source of emitted sound is at a position in the up-down direction of the user, and the icon displayed superimposed on the field of view. Although explanation is given here of an example in which green is employed as the color representing the presence of the source of emitted sound at a position in the up-down direction of the user, it goes without saying that there is no limitation to green, and any recognizable color may be employed as the color to represent the presence of the source of emitted sound at a position in the up-down direction of the user.

Figure 12:
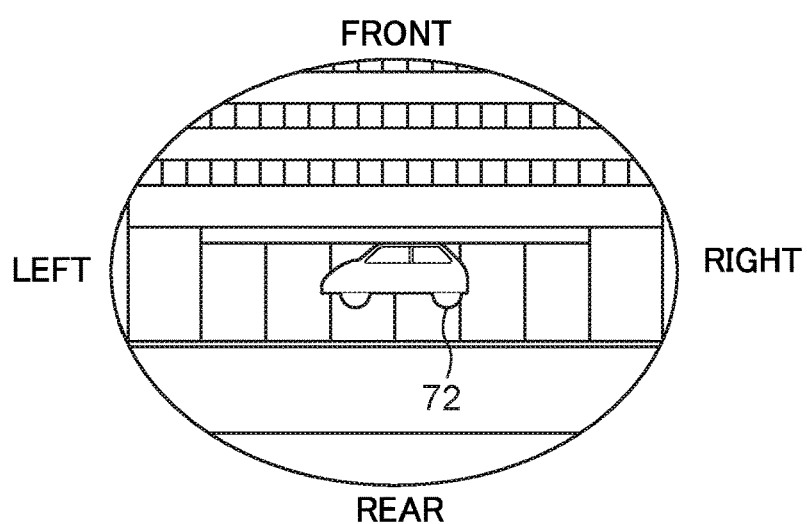
FIG. 12 is a diagram illustrating an example of icon display.

FIG. 12 is a diagram illustrating an example of display of an icon when vehicle traffic noise can be heard from above a user, such as, for example, at a grade-separated junction. In such cases, as illustrated in FIG. 12, a green icon 72 illustrated in FIG. 3G is displayed at a central area of the field of view, notifying the user that vehicle traffic noise can be heard from above. However, supposing that the vehicle traffic noise can be heard from above and to the front left of a user, the green icon 72 illustrated in FIG. 3G would be displayed at the top left of the field of view.

Moreover, if the vehicle traffic noise is present below the user, then as well as the icon 72 being displayed at the central area of the field of view as illustrated in FIG. 12, the fact that the source of emitted sound was below the user may be expressed by changing at least one out of the brightness, hue, or saturation of the icon 72. Specifically, for example, when the source of emitted sound is below the user, at least one of the brightness, hue, or saturation of the icon 72 is made different from in cases in which the source of emitted sound is above the user.

Figure 13:
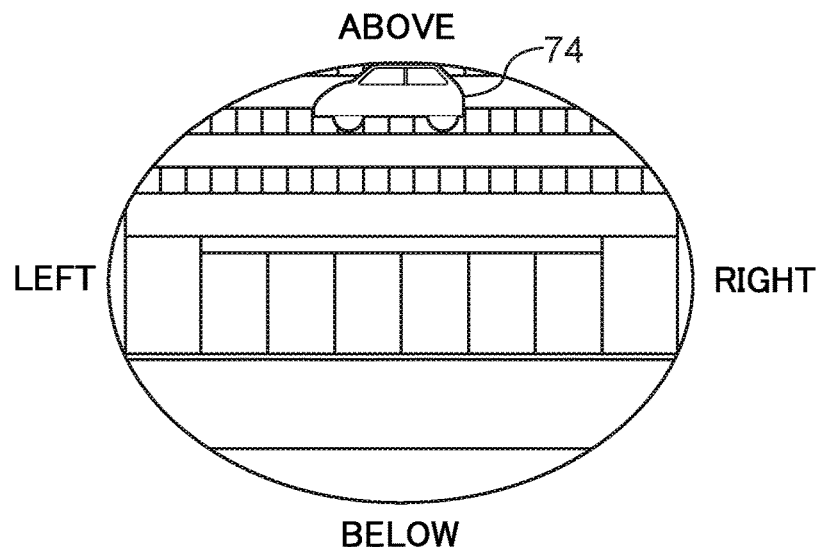
FIG. 13 is a diagram illustrating an example of icon display.

Moreover, the assignment of directions in FIG. 12 may be changed by instruction from the user. FIG. 13 illustrates an example of display of an icon when the upper field of view is assigned as "above", the lower field of view is assigned as "below", the right field of view is assigned as "right", and the left field of view is assigned as "left". In the directions assigned as illustrated in FIG. 13, when the vehicle traffic noise can be heard from above the user, the output section 28 displays the icon 74 illustrated in FIG. 3G in the upper field of view.

When the direction of emitted sound is assigned as in FIG. 13, in cases in which some sort of sound can be heard in front of or to the rear of the user, the corresponding icon is displayed superimposed on a central area of the field of view. Then at least one of the brightness, hue, or saturation of the icon is changed according to whether the source of emitted sound is in front of or behind the user.

Moreover, the audio recognition section 34 may compute the loudness of sound from the recognition target spectrum, and may change the display size of the icon according to the loudness of sound. For example, by increasing the display size of the icon corresponding to the type of sound as the loudness of the sound gets louder, the user can visually ascertain the loudness of sound emitted by the type of sound corresponding to the icon.

Figure 14:
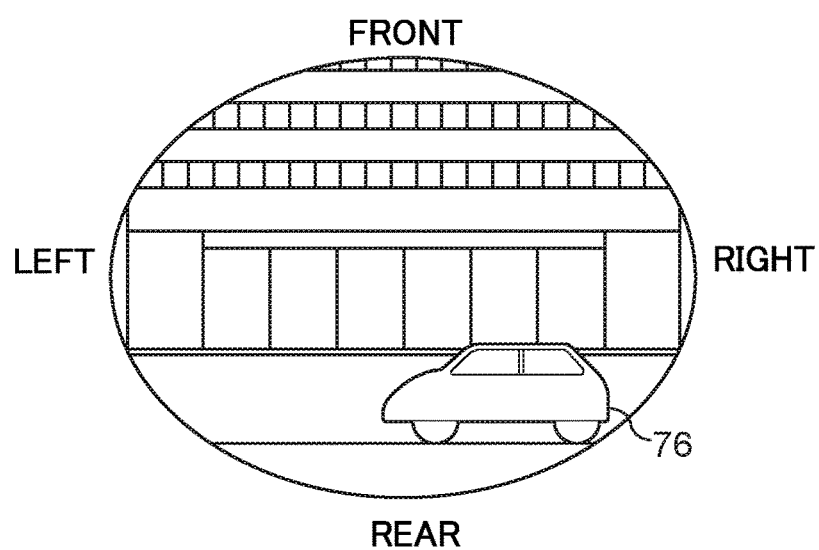
FIG. 14 is a diagram illustrating an example of icon display.

FIG. 14 is a diagram to explain an example of changing the display size of an icon according to loudness of a sound.

FIG. 11 and FIG. 14 both indicate that vehicle traffic noise can be heard from the right rear of a user. However, in the situation notification of the case illustrated in FIG. 14, the display size of the icon 76 illustrated in FIG. 14 is larger than the display size of the icon 70 illustrated in FIG. 11, enabling the user to be notified that the vehicle is closer to the user than in the situation illustrated in FIG. 11.

Moreover, the situation notification processing is, in contrast to the speech-to-caption processing illustrated in FIG. 6, executed on startup of the device 10. Thus, for example, it is possible to notify the user even in cases in which the user is unexpectedly addressed. Moreover, when the type of sound is recognized in the audio recognition section 34 as being a human voice, associated processing may be performed, such as starting up the speech-to-caption processing.

Note that in the situation notification processing, the device 10 may recognize the voice of the user themselves as a human voice and, for example, setting may be made such that the icon illustrated in FIG. 3A is not displayed. The user is more easily able to notice that they are being called out to by another person by setting such that the situation notification processing is not performed for the voice of the user themselves.

Moreover, in the situation notification processing, although an icon is utilized as the method of notifying a user of the type of sound, a mode may be adopted in which text is displayed instead of the icon, or a mode may be adopted in which text is displayed as well as the icon.

In this manner, by the person with hearing difficulties executing the speech-to-caption processing installed in the device 10 according to the first exemplary embodiment, the speech content of speakers can be ascertained more accurately and in a shorter period of time than by conversation through sign language interpretation or by written exchange. This enables easy communication with people nearby.

The sound that can be heard in the vicinity can be visualized by executing the situation notification processing installed in the device 10 according to the first exemplary embodiment. A person with hearing difficulties using the device 10 is thereby able to quickly notice various sounds emitted in daily life, and able to perform rapid situational determinations.

Note that by registering acoustic spectra and words for sounds of speech in languages of plural countries in the dictionary 46, and by providing language processing models in the language model section 48 for the languages of plural countries, the speech content of foreigners can also be recognized. In such cases, configuration may be made so as to display the speech content of foreigners after translating into the native language of the user.

Modified Example of the First Exemplary Embodiment

Although in the first exemplary embodiment explanation has been given of speech-to-caption processing and situation notification processing of the device 10; and of modes for displaying information corresponding to sound using captions, icons, and the like; explanation follows in the present modified example regarding an example of representing a display sequence of information corresponding to sound.

Figure 15:
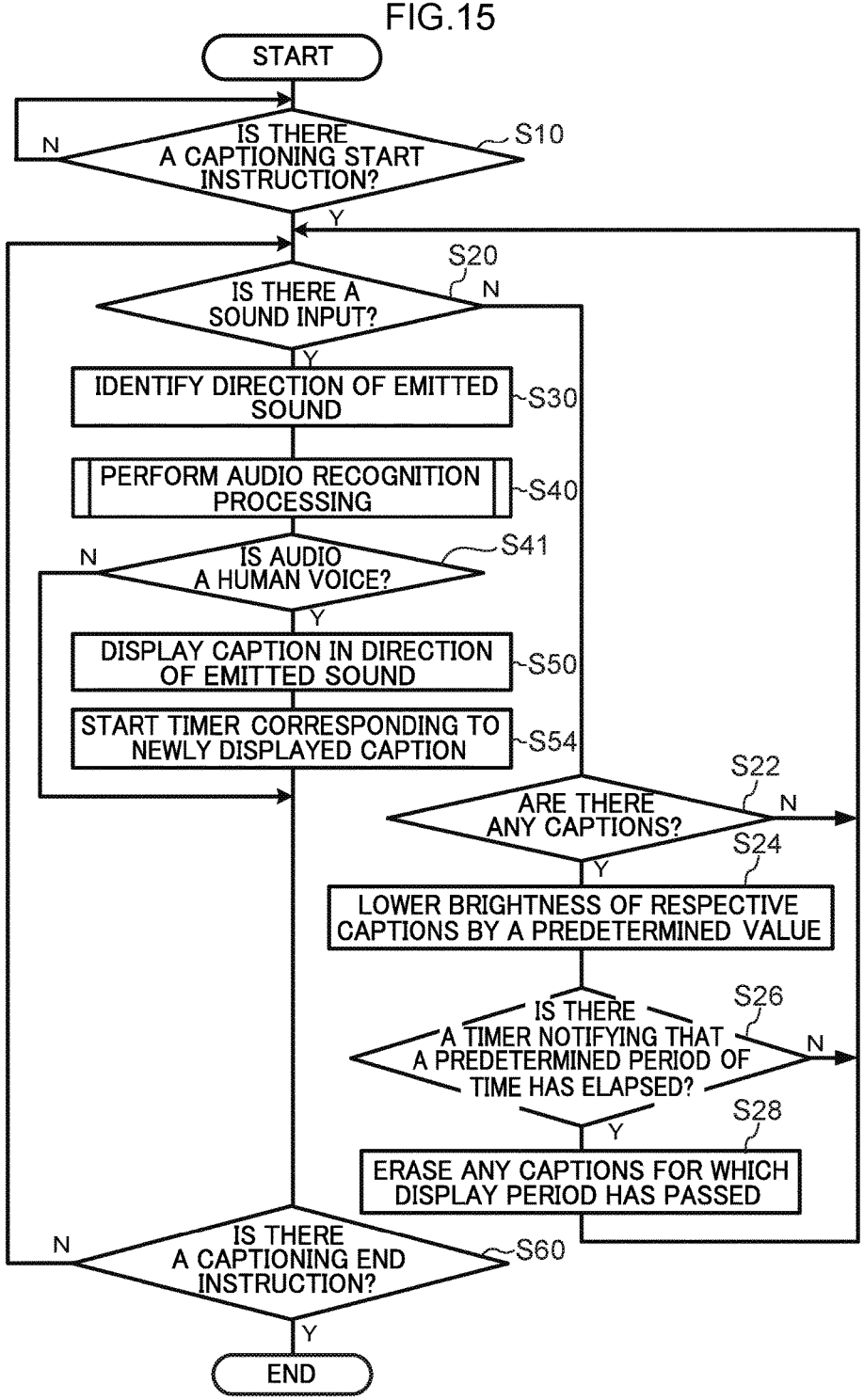
FIG. 15 is a flowchart illustrating an example of flow of speech-to-caption processing.

FIG. 15 is an example of a flowchart illustrating speech-to-caption processing of the device 10 in which processing to represent the display sequence of captions is added.

The point of difference in the flowchart of the speech-to-caption processing illustrated in FIG. 15 to the flowchart of the speech-to-caption processing illustrated in FIG. 6 is the point that the processing of each of steps S22 to S28 and step S54 have been added.

At step S54, the sound source location identification section 32 starts a timer for each caption instructed to be displayed by the output section 28 in the processing of step S50. When doing so, the sound source location identification section 32 sets a timer for notification to arrive by in the sound source location identification section 32, for example, after a predetermined period of time has elapsed, and starts the timer for each caption. Note that the timer may, for example, utilize a built-in timer function of the CPU 202.

Then, when there is determined to be no audio input in the determination processing of step S20, the sound source location identification section 32 executes the processing of steps S22 to S28 in what is referred to as an audio activation standby state.

First, at step S22, the sound source location identification section 32 determines whether or not there are any captions instructed to be displayed by the output section 28, and processing transitions to step S20 in cases in which negative determination is made. Moreover, processing transitions to step S24 in cases in which affirmative determination is made.

At step S24, the sound source location identification section 32 instructs the output section 28 to display the respective captions that were instructed to be displayed at a brightness decreased by a predetermined value.

Moreover, at step S26, the sound source location identification section 32 determines whether or not there is a timer notifying the elapse of a predetermined period of time from out of the timers started by the processing of the step S54. In cases in which negative determination is made processing transitions to step S20, and in cases in which affirmative determination is made processing transitions to step S28.

At step S28, the sound source location identification section 32 instructs the output section 28 to erase the caption corresponding to the timer notifying the elapse of a predetermined period of time in the processing of step S26.

Figure 16:
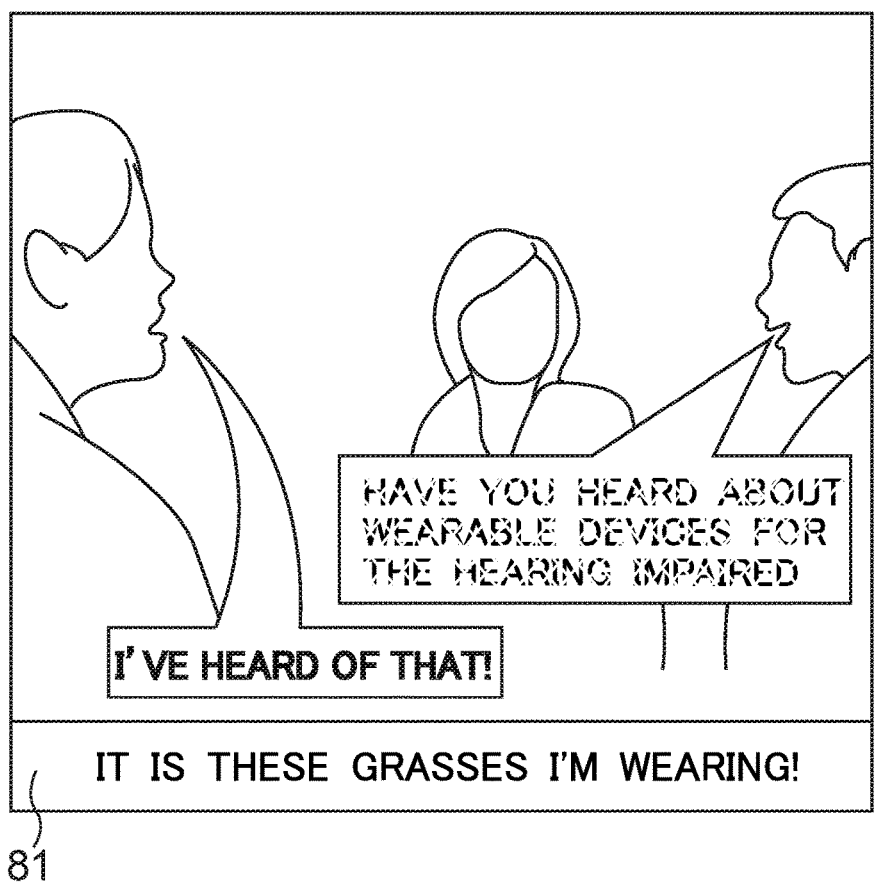
FIG. 16 is a diagram illustrating an example of caption display.

FIG. 16 is a diagram illustrating an example of captions displayed in the field of view of a user when the speech-to-caption processing illustrated in FIG. 15 has been executed.

In FIG. 16 an example is illustrated of display in which the brightness of the caption: "Have you heard about wearable devices for the hearing impaired?" is lower than the brightness of the caption: "I've heard of that!" In this manner, by repeatedly executing the processing of step S24 in the speech-to-caption processing illustrated in FIG. 15, the user is able to ascertain the display sequence of captions, since the longer ago the time a caption was uttered, the lower the brightness with which the caption is displayed.

Note that, for example, configuration may be made such that the degree of blur applied to captions is changed as a method to represent the display sequence of captions rather than changing the brightness of captions. Specifically, for example, configuration may be made such that the longer ago the time a caption was uttered, the greater the degree of blur applied to the caption, such that the sharpness of the caption is lowered. Moreover, a number may be displayed on captions to represent the display sequence of the captions In such processing to represent the display sequence of information corresponding to sounds, the situation notification processing illustrated in FIG. 9 may be applied by switching the target for representing the display sequence from captions to icons.

For example, the timers may be started for each of the icons after the processing of step S52. Then, in the audio activation standby state, in cases in which negative determination has been made in the processing of step S20, the brightness of icons can be changed according to the display sequence of the icons by executing the processing of each of the steps S22 to S28 illustrated in FIG. 15 for each of the icons being displayed.

In this manner, the device 10 according to the present modified example is able to notify users of which information is the most recently displayed information from out of the information corresponding to a sound by changing the visibility of captions and icons. The user is thereby able to understand the flow of a conversation and the flow of changes to the surrounding situation. Moreover, it is easier to ascertain the situation when there are a limited number of captions and icons displayed in the field of view due to the captions and the icons being erased after a predetermined period of time has elapsed.

Second Exemplary Embodiment

In the first exemplary embodiment, a device 10 has been explained in which the incident angle of sound is computed from the discrepancies in the arrival timing of audio signals obtained from each of the microphones 22, and the direction of the emitted sound is identified. In a second exemplary embodiment, a device will be explained in which the direction of gaze of the user is also detected, the direction of gaze and the identified direction of emitted sound are combined to correct the display positions of captions and icons.

Figure 17:
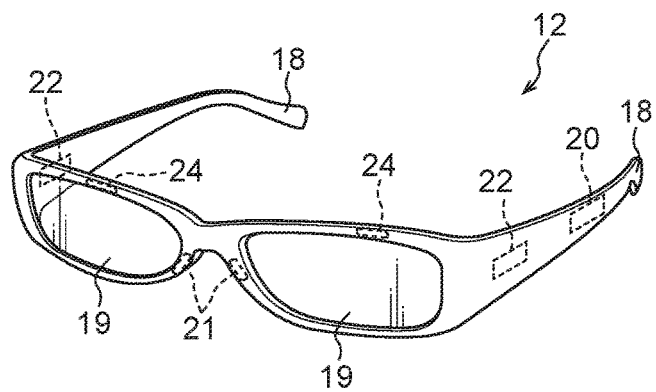
FIG. 17 is a diagram illustrating an example of a device according to a second exemplary embodiment.

FIG. 17 is a diagram illustrating an example of a wearable device according to the second exemplary embodiment.

As illustrated in FIG. 17, a wearable device 12 (referred to below as device 12) is a glasses-style terminal further including respective ocular potential sensors 21 built into two nose pad sections at the left and right of the device 10 according to the first exemplary embodiment. Namely, the device 12 has a structure the same as that of the device 10, except for building in the ocular potential sensors 21.

In a human eyeball, the potential of the skin around the eyeball changes with movement of the eyeball due to the cornea being positively charged and the retina being negatively charged. The ocular potential sensors 21 are sensors that measure movement of the eyeballs of the user wearing the device 12 from the potential difference arising at the skin surrounding the nose pad sections to detect the direction of gaze of the user.

Note that in the second exemplary embodiment, an example is given in which the ocular potential sensors 21 are employed as a method of measuring eyeball movement, with this being adopted due to the low cost of the comparatively simple configuration of such a device, and due to the comparatively easy maintenance thereof. However, the method of measuring eyeball movement is not limited to the method using the ocular potential sensors 21. A known method for measuring eyeball movement may be employed therefor, such as a search coil method, a scleral reflection method, a corneal reflection method, a video-oculography method, or the like.

Moreover, although the device 12 has two built-in ocular potential sensors 21, the number of ocular potential sensors 21 is not limited thereto. Moreover, there is also no limitation to the place where the ocular potential sensors 21 are built in as long they are at a position where the potential difference that arises around the eyeballs can be measured. For example, the ocular potential sensors 21 may be provided at a bridging section linking the right transparent member 19 to the left transparent member 19, or the ocular potential sensors 21 may be provided to frames surrounding the transparent members 19.

Figure 18:
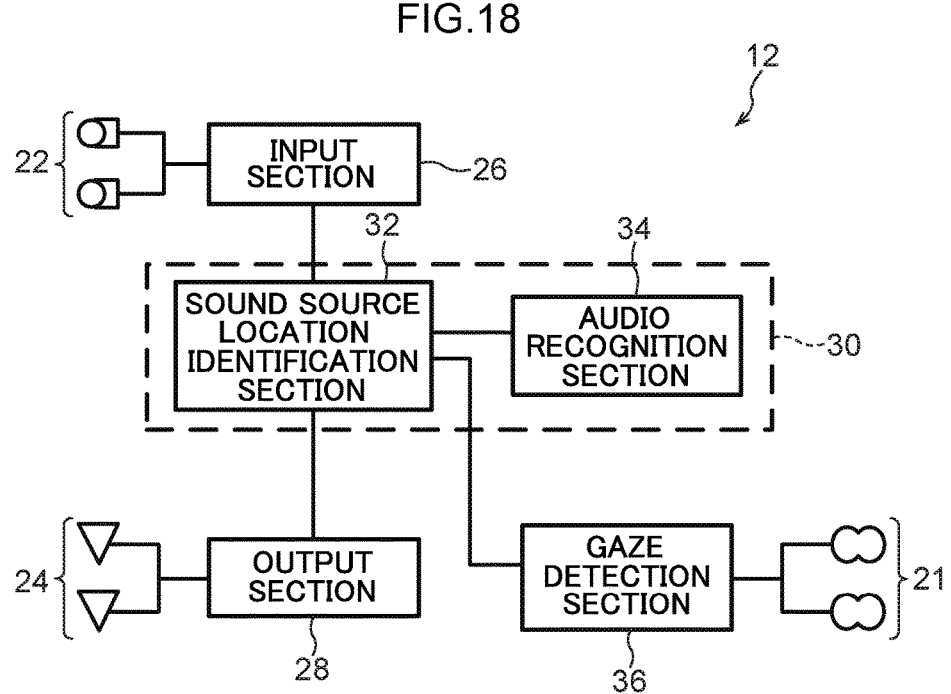
FIG. 18 is a functional block diagram illustrating an example of functionality of a device according to the second exemplary embodiment.

FIG. 18 is a functional block diagram illustrating the functions of the device 12 illustrated in FIG. 17. In the functional block diagram of the device 12 illustrated in FIG. 17, the point of difference to the functional block diagram of the device 10 according to the first exemplary embodiment illustrated in FIG. 2 is the point that a gaze detection section 36 is added thereto.

The gaze detection section 36 detects which direction the user is gazing in from the information of the potential difference acquired by the ocular potential sensors 21, and notifies the sound source location identification section 32.

Figure 19:
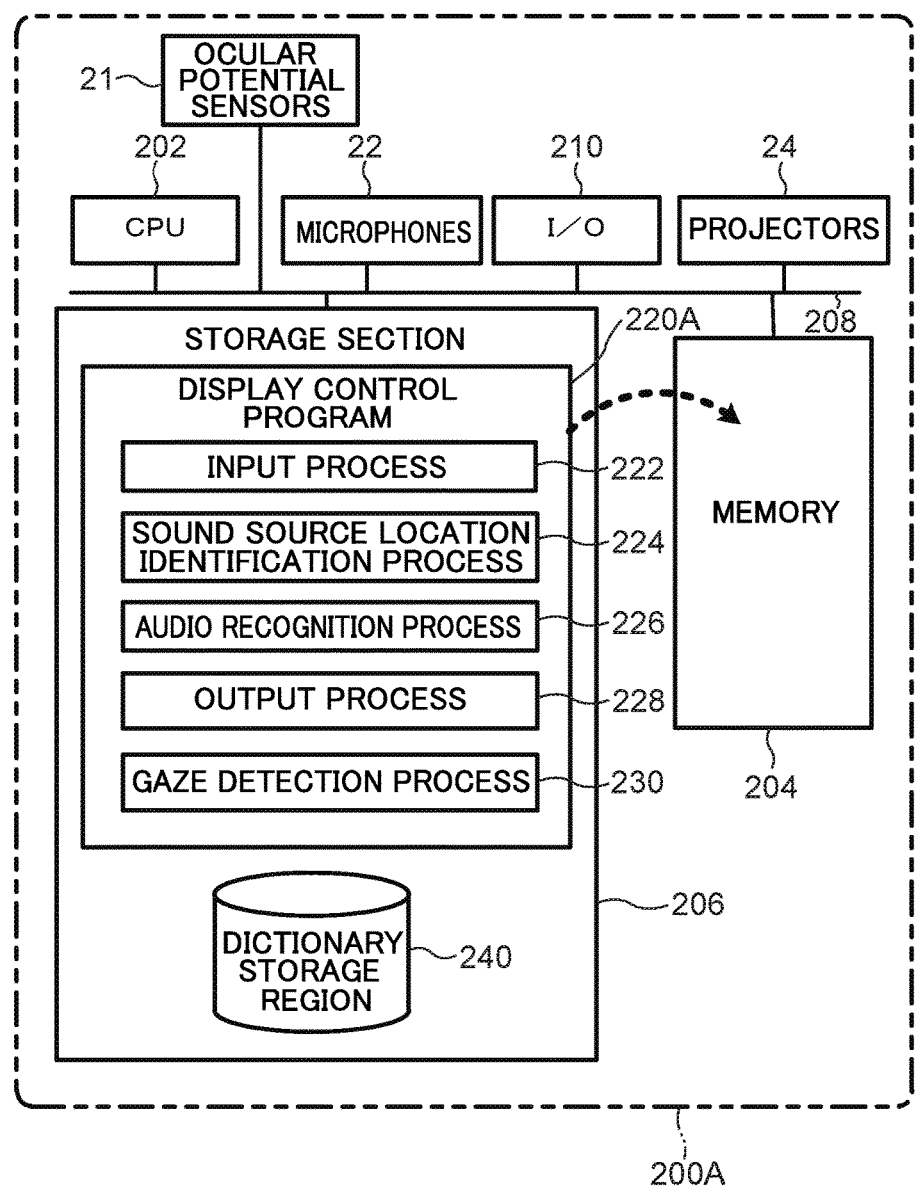
FIG. 19 is a diagram illustrating an example of a configuration when a device according to the second exemplary embodiment is implemented by a computer.

Next, a configuration diagram is illustrated in FIG. 19 for when each of the functional sections of the device 12 is implemented by a computer.

In a configuration diagram of a computer 200A illustrated in FIG. 19, the points of difference to the configuration diagram of the computer 200 according to the first exemplary embodiment illustrated in FIG. 5 are the point that a gaze detection process 230 is added to a display control program 220A and the point that the ocular potential sensors 21 are connected to the bus 208.

By reading the display control program 220A from the storage section 206, expanding the display control program 220A into the memory 204, and executing the display control program 220A, the CPU 202 causes the computer 200A to operate as each of the functional sections of the device 12 illustrated in FIG. 18. The computer 200A operates as the gaze detection section 36 illustrated in FIG. 18 by the CPU 202 executing the gaze detection process 230.

Each of the functional sections of the device 12 may be implemented by, for example, a semiconductor integrated circuit, or more specifically, by an ASIC or the like.

Next, explanation follows regarding operation of the device 12 according to the second exemplary embodiment. The device 12 according to the second exemplary embodiment executes the speech-to-caption processing after the device 12 is started up.

Figure 20:
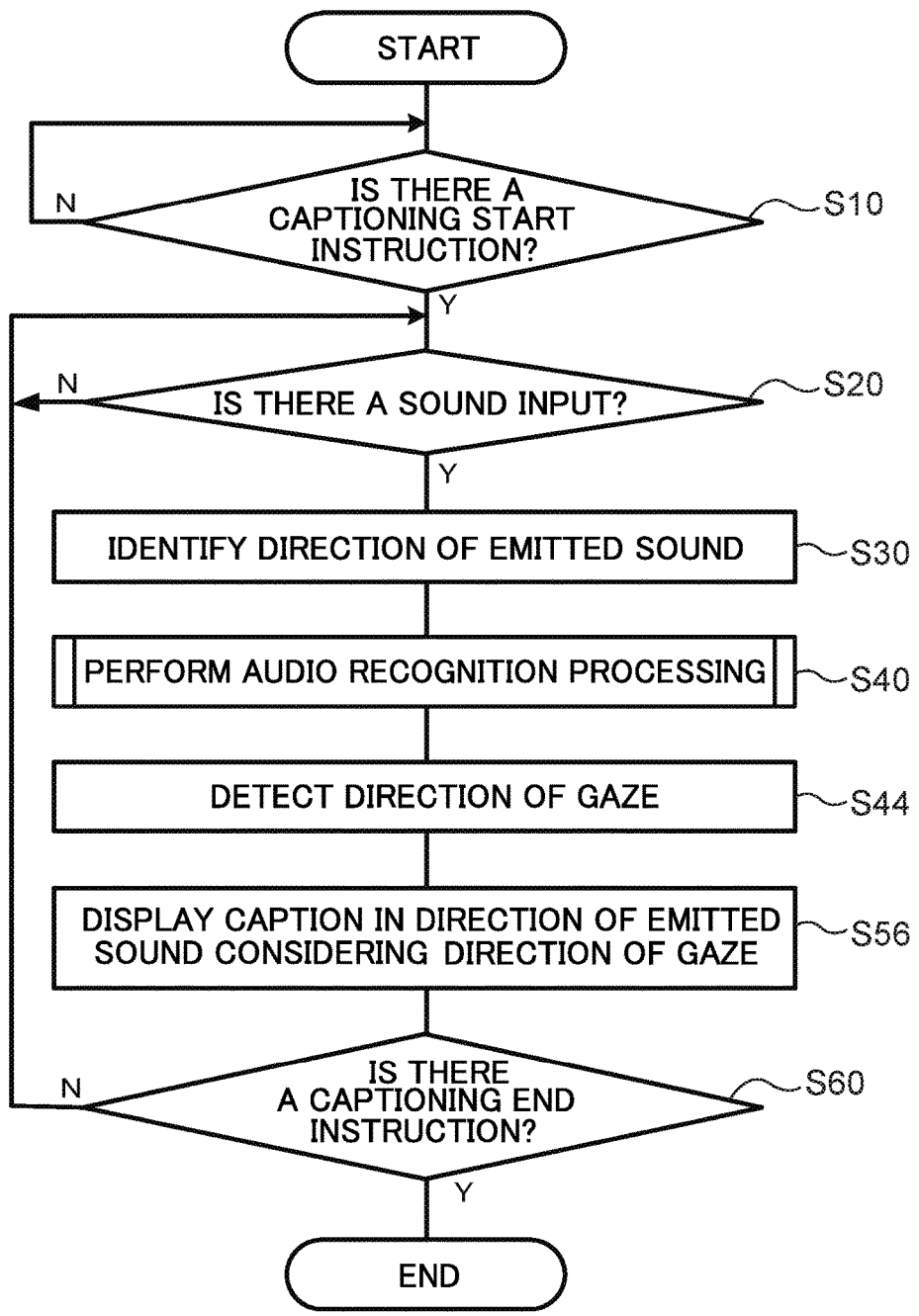
FIG. 20 is a flowchart illustrating an example of flow of speech-to-caption processing.

FIG. 20 is a flowchart illustrating an example of flow of speech-to-caption processing of the device 12. In the flowchart illustrated in FIG. 20, the points of difference to the flowchart of speech-to-caption processing according to the first exemplary embodiment illustrated in FIG. 6 are the point that step S44 is added, and the point that step S50 is replaced by the processing of step S56.

At step S44, the gaze detection section 36 detects the direction of gaze of a user from information of potential difference acquired by the ocular potential sensors 21. Specifically, the gaze detection section 36 computes the direction of gaze of a user by referencing a gaze computation table in which combinations of the potential differences obtained from the respective ocular potential sensors 21 are associated with angles of gaze in a three-dimensional coordinate space having the position of the device 12 as the origin.

Note that the angles of gaze corresponding to the combinations of potential differences are found in advance by experimentation using an actual device 12, by computer simulation based on the design specification of the device 12, or the like. The gaze correspondence table is then, for example, stored in advance in a predetermined region of the memory 204.

The gaze detection section 36 then notifies the sound source location identification section 32 of the computed direction of gaze.

At step S56, the similarly to in the processing of step S50 illustrated in FIG. 6, the sound source location identification section 32 decides on a provisional display position for the caption acquired by the processing of step S40 from the direction of emitted audio identified by the processing of step S30. The sound source location identification section 32 then corrects the provisionally decided display position of the caption using the direction of gaze of the user detected by the processing of step S44.

For example, if the direction of emitted sound is to the right from the user viewing straight ahead and the gaze of the user is also to the right from the user viewing straight ahead, then a caption is displayed at a position nearer to the central area of the field of view than when the gaze of the user is straight ahead of the user.

The center of the field of view of the user changes according to the direction of gaze of the user. Thus, if a caption is merely displayed in a position corresponding to the direction of emitted sound identified from discrepancies in arrival timing of the audio signals, sometimes the user becomes aware of a discrepancy between the display position of the caption and the direction of emitted sound.

The device 12 is accordingly able to display which speaker uttered the speech corresponding to a caption in the field of view of the user with better precision than the device 10 according to the first exemplary embodiment.

Note that in the first exemplary embodiment, the presence or absence of a captioning start instruction at step S10, and the presence or absence of a captioning end instruction at step S60 are, for example, determined based on operation of a button or the like, not illustrated in the drawings, provided to the device 10.

However, due to the ocular potential sensors 21 being provided to the device 12, for example, a particular eye sign, such as 3 blinks in succession, may be employed to switch between starting and ending speech-to-caption processing. In such cases, operability is improved compared to operation to switch starting and stopping of speech-to-caption processing by hand.

The device 12 executes situation notification processing after the device 12 is started up.

Figure 21:
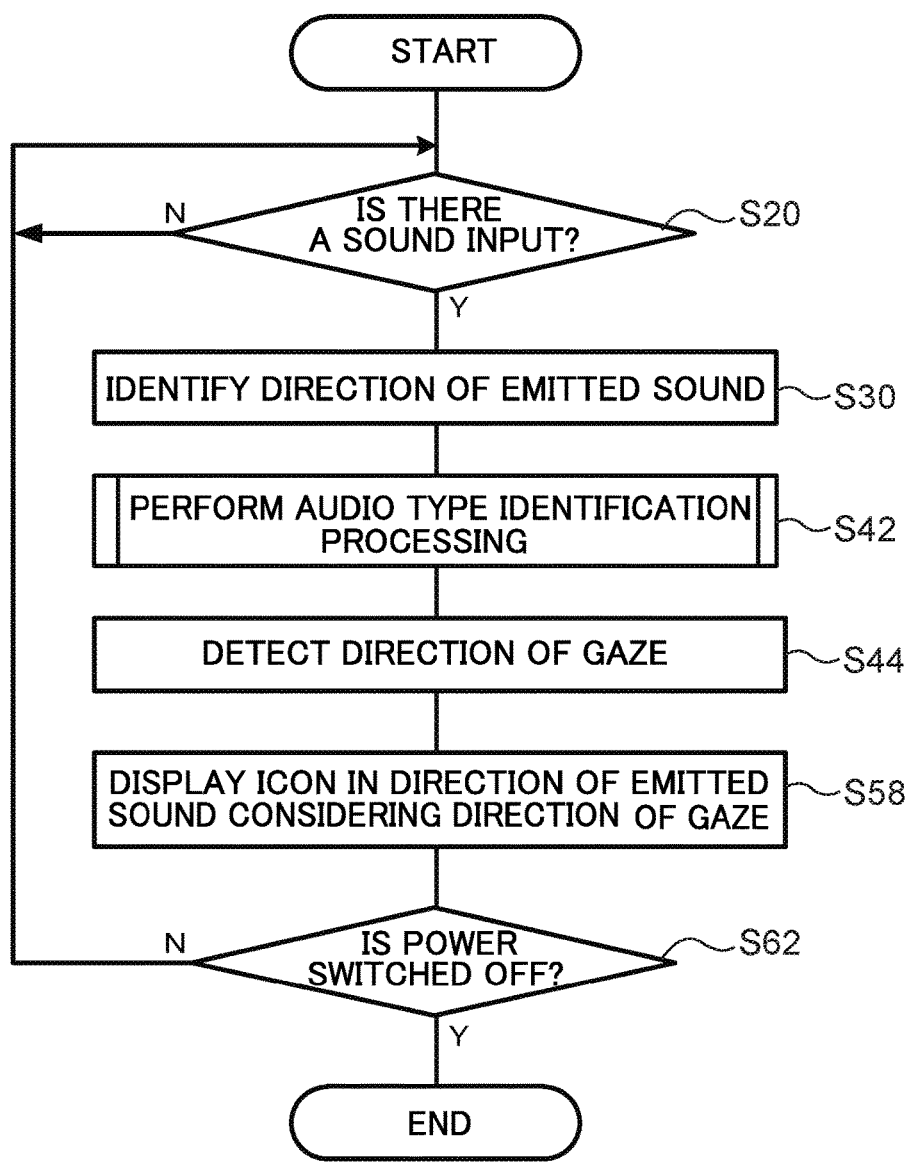
FIG. 21 is a flowchart illustrating an example of flow of situation notification processing.

FIG. 21 is a flowchart illustrating an example of a flow of situation notification processing of the device 12. In the flowchart illustrated in FIG. 21, the points of difference to the flowchart of situation notification processing according to the first exemplary embodiment illustrated in FIG. 9 are the point that step S44 is added and the point that step S52 is replaced by the processing of step S58.

At step S44, the direction of gaze of the user is detected by processing similar to that of step S44 in the speech-to-caption processing explained in FIG. 20.

At step S58, after replacing captions with icons as the display position to be corrected, by performing the processing of step S56 in the speech-to-caption processing explained in FIG. 20, the display position of the icon is corrected using the direction of gaze of the user detected by the processing of step S44.

The device 12 is accordingly able to display the position of a source of emitted sound in the field of view of the user with good precision, taking into consideration the direction of gaze of the user.

It goes without saying that the content suggested for the device 10 according to the first exemplary embodiment is also applicable to the device 12 according to the second exemplary embodiment.

Third Exemplary Embodiment

There are cases in which a person with hearing difficulties wishes to orally convey their thoughts, as stated before, however it is often difficult to acquire the correct pronunciation due to the person with hearing difficulties finding it difficult to confirm their own voice, with the possibility that the intended content is not conveyed to the other party. Such a tendency is often apparent in persons with hearing difficulties from birth and persons whose hearing deteriorates during infancy.

Thus explanation follows regarding a device in the third exemplary embodiment provided with what is referred to as a speech production function for converting a sentence generated by a user into sound and outputting the sound to nearby people.

Figure 22:
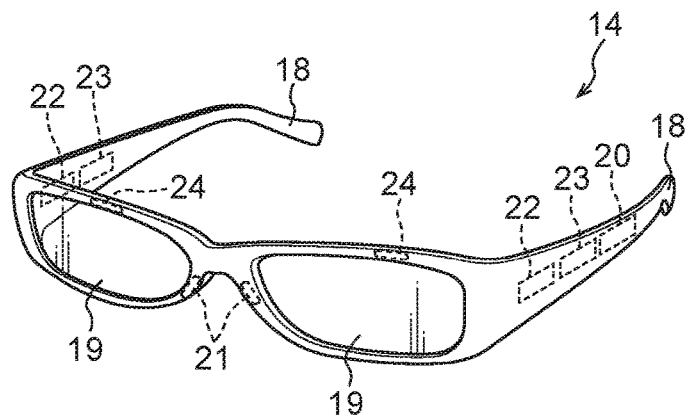
FIG. 22 is a diagram illustrating an example of a device according to a third exemplary embodiment.

FIG. 22 is a diagram illustrating an example of a wearable device according to the third exemplary embodiment.

As illustrated in FIG. 22, a wearable device 14 (referred to below as device 14) is a glasses-style terminal in which speakers 23 are further built into the temples 18 of the device 12 according to the second exemplary embodiment. The speakers 23 are built into the left and right temples 18 of the wearable device 14 illustrated in FIG. 22; however, this is merely an example, and there is no limitation to the position and number of the speakers 23 built into the device 14.

Figure 23:
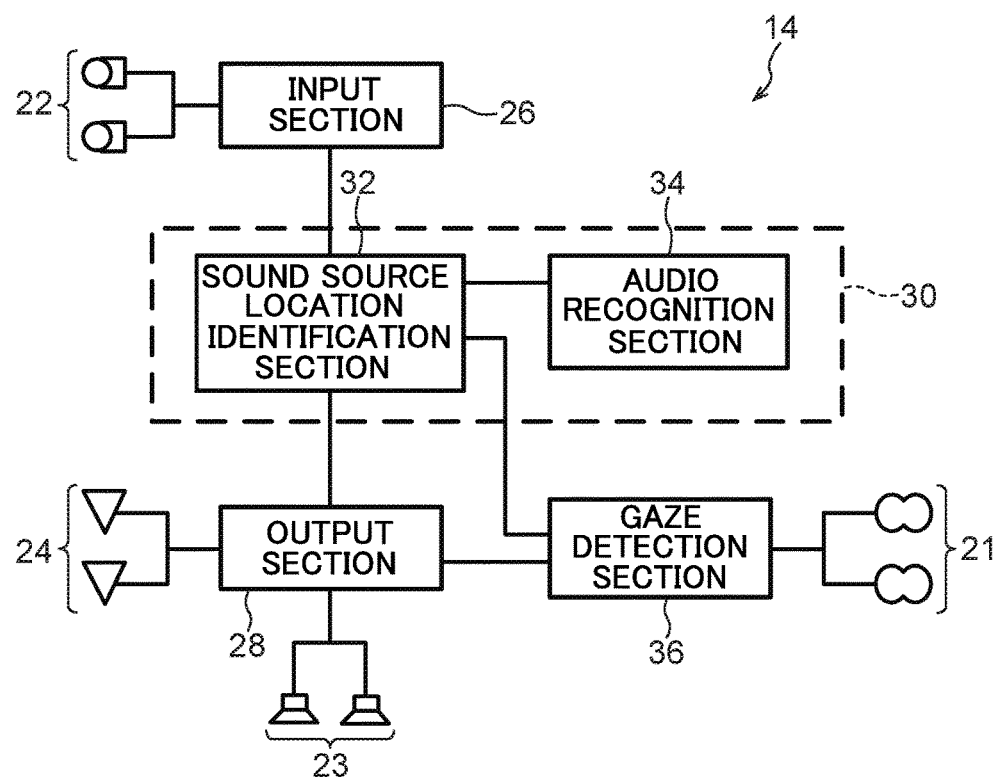
FIG. 23 is a functional block diagram illustrating an example of functionality of a device according to the third exemplary embodiment.

FIG. 23 is a functional block diagram illustrating the functions of the device 14 illustrated in FIG. 22. The points of difference in the functional block diagram of the device 14 illustrated in FIG. 23 to the functional block diagram of the device 12 according to the second exemplary embodiment illustrated in FIG. 18 are the point that the speakers 23 are connected to the output section 28, and the point that the output section 28 and the gaze detection section 36 are directly connected to each other.

On receipt, for example, of an instruction from a user using a particular eye sign to start the speech production function, the gaze detection section 36 instructs the output section 28 to display, in the field of view of the user, a keyboard with characters, such as the letters of the alphabet, with each character arrayed at a different position. The gaze detection section 36 then detects which character on the keyboard the user is looking at from the potential differences measured by the ocular potential sensors 21, and identifies the character selected by the user. The gaze detection section 36 then notifies the output section 28 of a sentence represented by a string of characters selected by the user at a timing designated by the user.

The output section 28 converts the sentence notified by the gaze detection section 36 into an audio rendition of the sentence, and outputs the audio rendition of the sentence from the speakers 23.

Note that a configuration of a case in which each of the functional sections of the device 14 is implemented by a computer is a mode in which the speakers 23 are further connected to the bus 208 in a configuration diagram of a case in which each of the functional sections of the device 12 illustrated in FIG. 19 are implemented by a computer.

Next, explanation follows regarding operation of the device 14 according to the third exemplary embodiment. The device 14 according to the third exemplary embodiment executes the speech production processing after the device 14 is started up.

Figure 24:
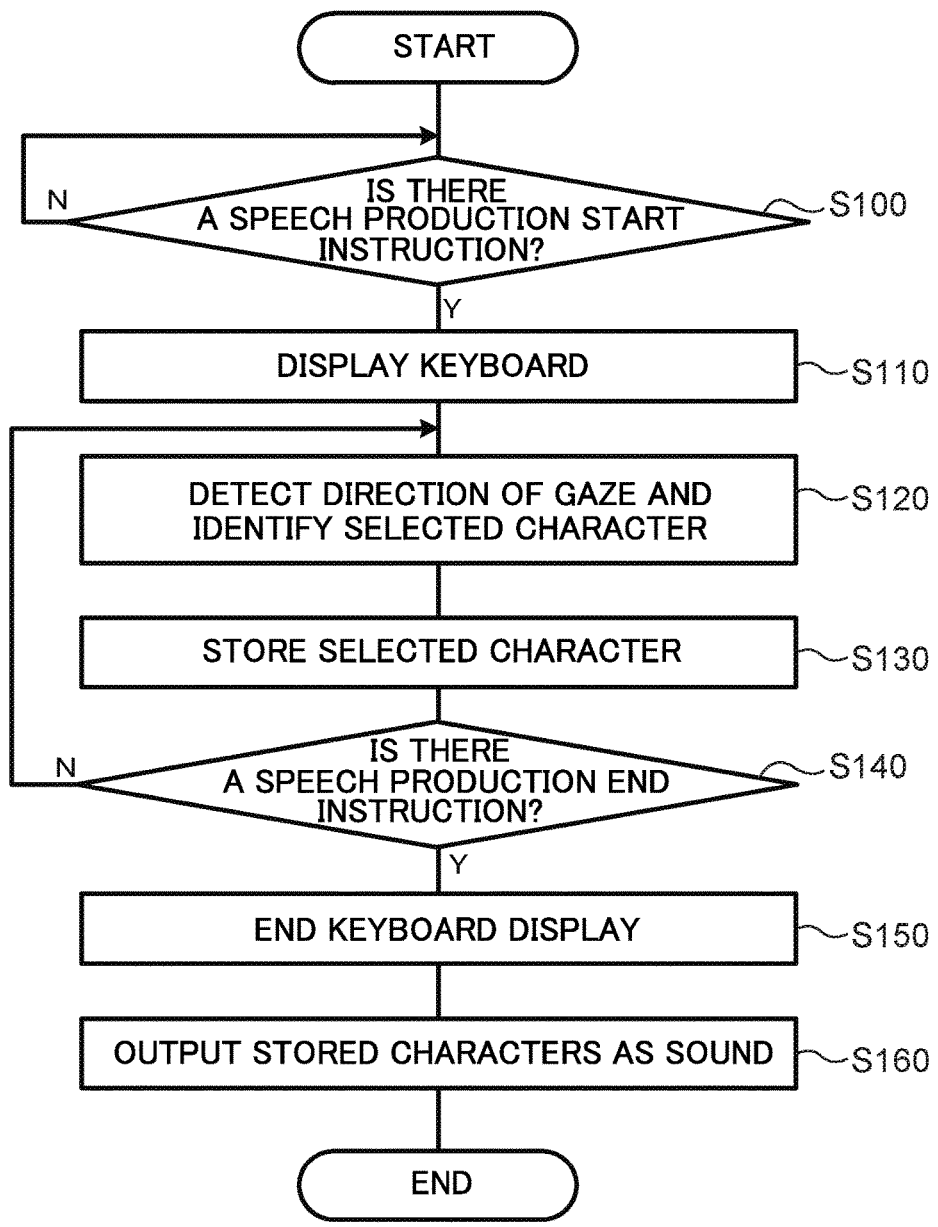
FIG. 24 is a flowchart illustrating an example of flow of speech production processing.

FIG. 24 is a flowchart illustrating an example of the flow of the speech production processing of the device 14.

First, at step S100, the gaze detection section 36 acquires the changes in potential difference around the eyeballs of the user from the ocular potential sensors 21. Then, by checking to see if the change status of the acquired potential difference matches changes in potential difference arising from a predetermined eye sign, predetermined as a speech production start instruction, the gaze detection section 36 determines whether or not a speech production start instruction has been notified by the user. Then, in cases in which negative determination is made, a speech production start instruction from the user is awaited by repeatedly executing the processing of step S100. However, in cases in which affirmative determination is made, the gaze detection section 36 instructs the output section 28 to display the keyboard, and processing transitions to step S110.

Note that information related to the changes in potential difference corresponding to the eye sign of the speech production start instruction may, for example, be pre-stored in a predetermined region of the memory 204.

At step S110, on receipt of the instruction from the gaze detection section 36 to display the keyboard, the output section 28 uses the projectors 24 to display the keyboard in the field of view of the user. The keyboard has, for example, characters, alphanumeric characters, and symbols, etc. displayed thereon, and the output section 28 switches the display content of the keyboard according to receipt of an instruction from the gaze detection section 36 to switch the display content of the keyboard. Note that it is possible for the user to pre-set the types of character first displayed on the keyboard, and, for example, a user of English is able to display on the keyboard characters used in English, and a user of Japanese is able to display on the keyboard characters used in Japanese.

At step S120, the gaze detection section 36 detects which character the user is looking at on the keyboard from the potential differences measured by the ocular potential sensors 21 and identifies the character selected by the user. Specifically, for example, the gaze detection section 36 references a character conversion table with pre-associations between potential differences measured by the ocular potential sensors 21 and the character on the keyboard being looked at when these potential differences arise so as to identify the character selected by the user.

The correspondence relationships between the potential differences measured by the ocular potential sensors 21 and the character being looked at on the keyboard when the potential differences arise are found in advance by experimentation using an actual device 14, by computer simulation based on the design specification of the device 14, or the like. The character conversion table is then, for example, pre-stored in a predetermined region of the memory 204.

At the next step S130, the gaze detection section 36 stores the character selected by the user as identified by the processing of step S120 in, for example, a predetermined region of the memory 204.

At step S140, the gaze detection section 36 acquires the changes in potential difference around the eyeballs of the user from the ocular potential sensors 21. Then, by checking to see if the change status of the acquired potential difference matches changes in potential difference arising from a predetermined eye sign, predetermined as a speech production end instruction, the gaze detection section 36 determines whether or not a speech production end instruction has been notified by the user. Then, in cases in which negative determination is made, processing transitions to step S120, and the processing of step S120 to step S140 is executed repeatedly. By repeatedly executing the processing of step S120 to S140, the characters selected by the user, as identified by the processing of step S120, are stored in sequence in the memory 204 by the processing of step S130, and a sentence the user wishes to convey is generated.

However, in cases in which affirmative determination is made, processing transitions to step S150.

At step S150, the output section 28 stops display of the keyboard displayed by the processing of step S110.

At step S160, the output section 28 then converts the sentence stored in the predetermined region of the memory 204 by the processing of step S130 into an audio rendition of the sentence, and outputs the audio rendition of the sentence from the speakers 23. Note that any known voice synthesis technology may be applied for synthesizing audio for output.

When doing so, the tone of the sound may be varied according to the content and context of the sentence. Specifically, if the content of the sentence is to be conveyed urgently, then the sound is output from the speakers 23 at a faster speaking speed and higher pitch than the normal speaking speed and pitch registered in advance by a user. Such a case enables utterances to match the situation, and enables expressive communication to be achieved.

Moreover, peripheral sound may be picked up by the microphones 22; and the acoustic spectrum of the sound that was picked up used in analysis of the frequency components that will be easier to convey in the vicinity, such that the audio rendition of the sentence contains the analyzed frequency components. Such a case makes the sound emitted from the speakers 23 easier to hear.

The speech production function is implemented by the above processing of step S100 to step S160.

If the voiceprint of the user is pre-stored in the memory 204, since the output section 28 is able to synthesize sound in the voice of the user by utilizing known voice synthesis technology, more natural conversation can be achieved.

Moreover, after the processing of step S120 of FIG. 24, configuration may be made so as to analyze the context of the sentence from the string of characters that have been selected by the user so far, and from the context of the sentence, anticipate and display candidate words likely to be selected by the user. Such a method of displaying words is sometimes called "predictive display".

Specifically, the language model section 48 acquires the characters identified by the processing of step S120 and information about the string of characters that have been selected by the user so far, stored in a predetermined region of the memory 204 by the processing of step S130. The language model section 48 then ascertains the context of the sentence by executing morphological analysis or the like on the string of characters, and, according to a statistical model, selects candidate words that follow the flow of the context of the sentence starting with the identified characters from words registered in advance in the dictionary 46, for example. The output section 28 then displays plural of the candidate words selected by the language model section 48 in the field of view of the user, raising the operability in terms of user character selection.

In this manner, the device 14 is able to convert into audio a sentence constructed utilizing user eyeball movements, and is accordingly able to convey the intention of a speaker to another party in a shorter period of time and more accurately than by conversation through sign language interpretation or by written exchange.

Note that it goes without saying that the content suggested for the device 10 according to the first exemplary embodiment and the device 12 according to the second exemplary embodiment may also be applied to the device 14 according to the third exemplary embodiment.

Fourth Exemplary Embodiment

In the first exemplary embodiment to the third exemplary embodiment, explanation has been given of embodiments in which the previously explained speech-to-caption processing, situation notification processing, and speech production processing are executed in the processing device 20 built into the device 10, 12, or 14.

Explanation follows regarding the fourth exemplary embodiment in which part of the processing executed by the device 10, 12, or 14 utilizes a cloud service. Note that a cloud service is a service to provide the processing power of information processing devices such as computers over a network.

Figure 25:
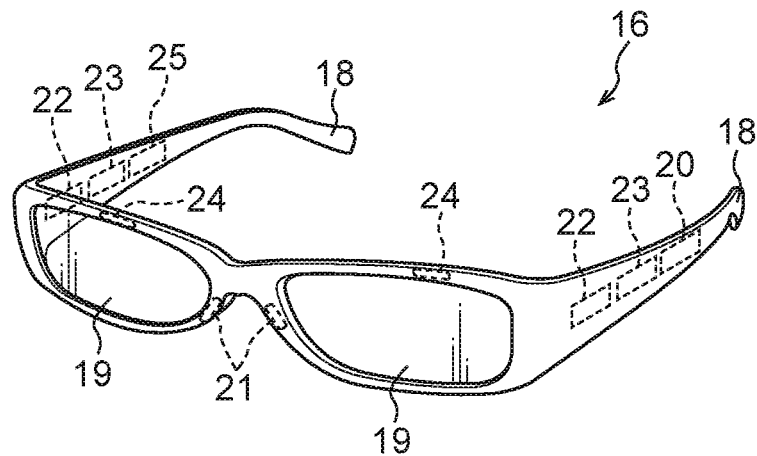
FIG. 25 is a diagram illustrating an example of a device according to a fourth exemplary embodiment.

FIG. 25 is a diagram illustrating an example of a wearable device according to the fourth exemplary embodiment.

As illustrated in FIG. 25, a wearable device 16 (referred to below as device 16) is a glasses-style terminal further including a built-in communication device 25 built into the device 14 according to the third exemplary embodiment. Note that the location where the communication device 25 is built into the device 16 is merely an example, and is not limited to a position on the temple 18.

Figure 26:
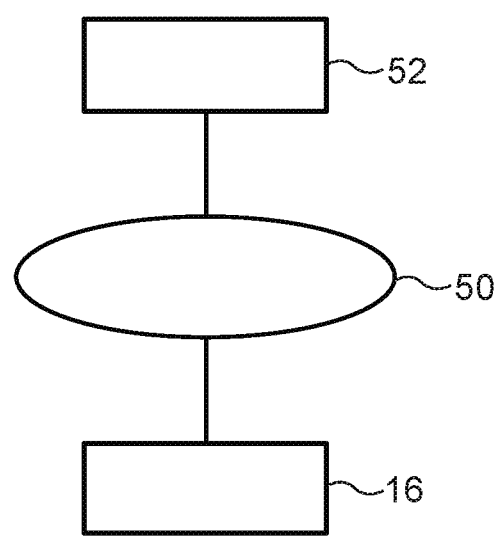
FIG. 26 is a diagram illustrating an example of a connection mode between a device and an information processing device.

The communication device 25 is, for example, a device including an interface for connecting to a network, such as the internet, in order to exchange data between the device 16 and an information processing device 52 connected to a network 50, as illustrated in FIG. 26.

Note that there is no limitation to the communication protocol employed by the communication device 25, and, for example, various communication protocols may be employed such as Long Term Evolution (LTE), the standard for wireless fidelity (WiFi), and Bluetooth. However, due to the device 16 being a wearable device presuming movement, the communication device 25 is preferably capable of connecting to the network 50 wirelessly. Thus explanation follows as an example here regarding a wireless mode of connecting the communication device 25 to the network 50. The information processing device 52 may also include plural computers or the like.

Figure 27:
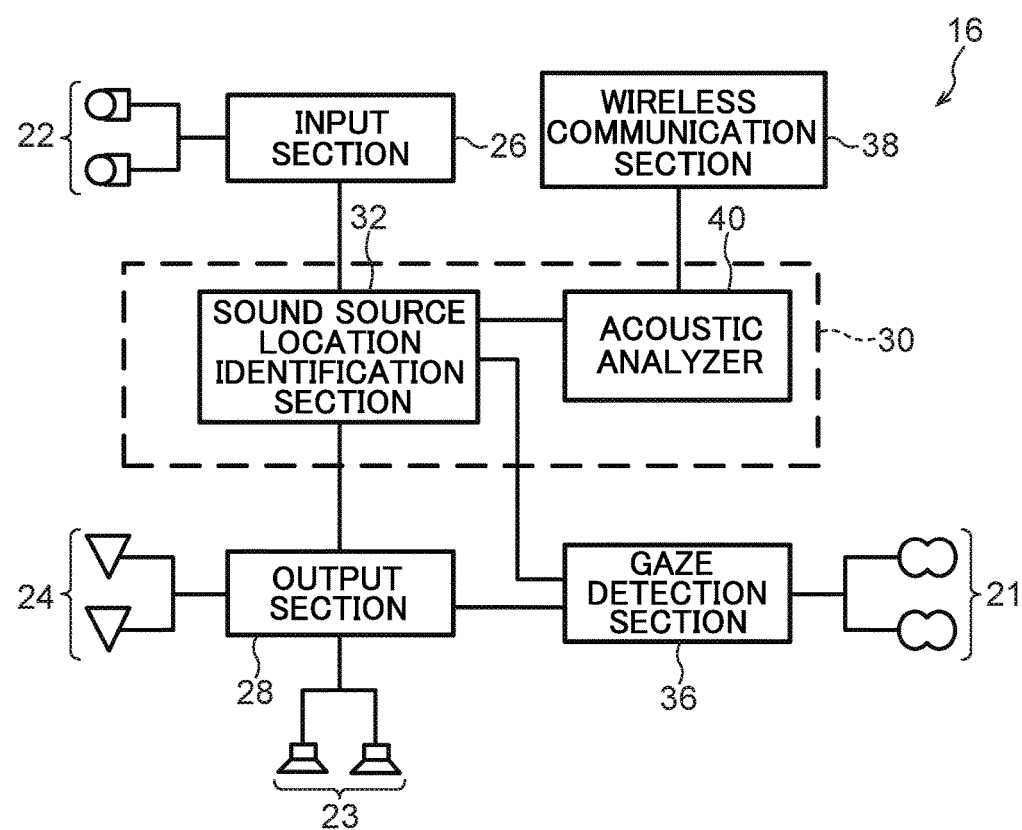
FIG. 27 is a functional block diagram illustrating an example of functionality of a device according to the fourth exemplary embodiment.

FIG. 27 is a functional block diagram illustrating functions of the device 16 illustrated in FIG. 25. In the functional block diagram of the device 16 illustrated in FIG. 27, the points of difference to the functional block diagram of the device 14 according to the third exemplary embodiment illustrated in FIG. 23 are the points that the audio recognition section 34 is replaced with an acoustic analyzer 40, and a wireless communication section 38 is added and connected to the acoustic analyzer 40.

Figure 28:
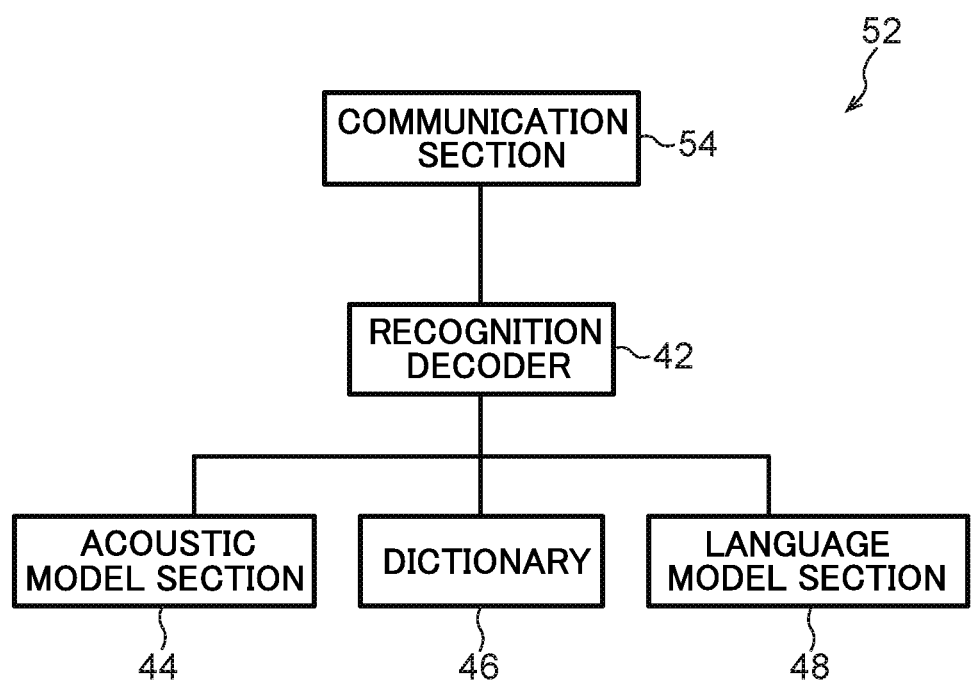
FIG. 28 is a functional block diagram illustrating an example of functionality of an information processing device.

Moreover, FIG. 28 is a functional block diagram illustrating functions of the information processing device 52. The information processing device 52 includes a recognition decoder 42, an acoustic model section 44, a dictionary 46, a language model section 48, and a communication section 54. Note that the communication section 54 is connected to the network 50 and includes a function for exchanging data with the device 16. Moreover, the mode of connecting the communication section 54 to the network 50 may be either a wired or wireless mode.

In this manner, in the fourth exemplary embodiment, from out of the configuration elements of the audio recognition section 34 included in the device 10, 12, or 14; the acoustic analyzer 40 remains in the device 16; and the recognition decoder 42, the acoustic model section 44, the dictionary 46, and the language model section 48 are transferred to the information processing device 52. The acoustic analyzer 40, and the recognition decoder 42, the acoustic model section 44, the dictionary 46, and the language model section 48 are then connected to the wireless communication section 38 and the communication section 54, in a mode in which a cloud service is utilized over the network 50 to implement the functionality of the audio recognition section 34.

Figure 29:
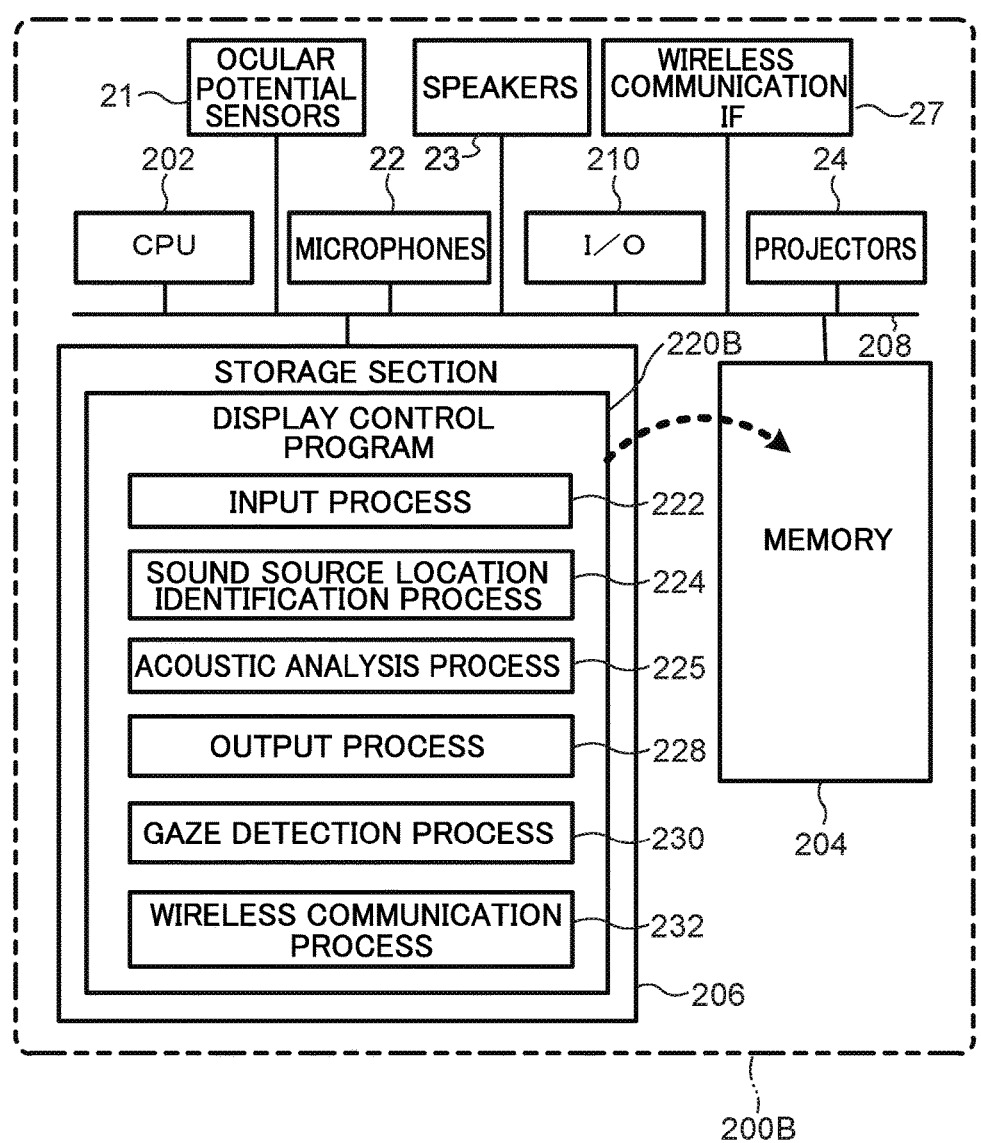
FIG. 29 is a diagram illustrating an example of a configuration when a device according to the fourth exemplary embodiment is implemented by a computer.

Next, a configuration diagram is illustrated in FIG. 29 for when each of the functional sections of the device 16 is implemented by a computer.

In the configuration diagram of a computer 200B illustrated in FIG. 29, the points of difference to the configuration when each of the functional sections of the device 14 explained in the third exemplary embodiment is implemented by a computer is the point that a new wireless communication interface (IF) 27 is connected to the bus 208. Moreover, other differences to the third exemplary embodiment are the points that a wireless communication process 232 is added to the display control program 220B, and the audio recognition process 226 is replaced by an acoustic analysis process 225.

The CPU 202 reads the display control program 220B from the storage section 206, expands the display control program 220B into the memory 204, and executes the display control program 220B; thus, the CPU 202 causes the computer 200B to operate as each of the functional sections of the device 16 illustrated in FIG. 27. The CPU 202 then executes the wireless communication process 232 such that the computer 200B operates as the wireless communication section 38 illustrated in FIG. 27. The computer 200B operates as the acoustic analyzer 40 illustrated in FIG. 27 by the CPU 202 executing the acoustic analysis process 225.

Note that each of the functional sections of the device 16 may be implemented by, for example, a semiconductor integrated circuit, or more specifically, by an ASIC or the like.

Figure 30:
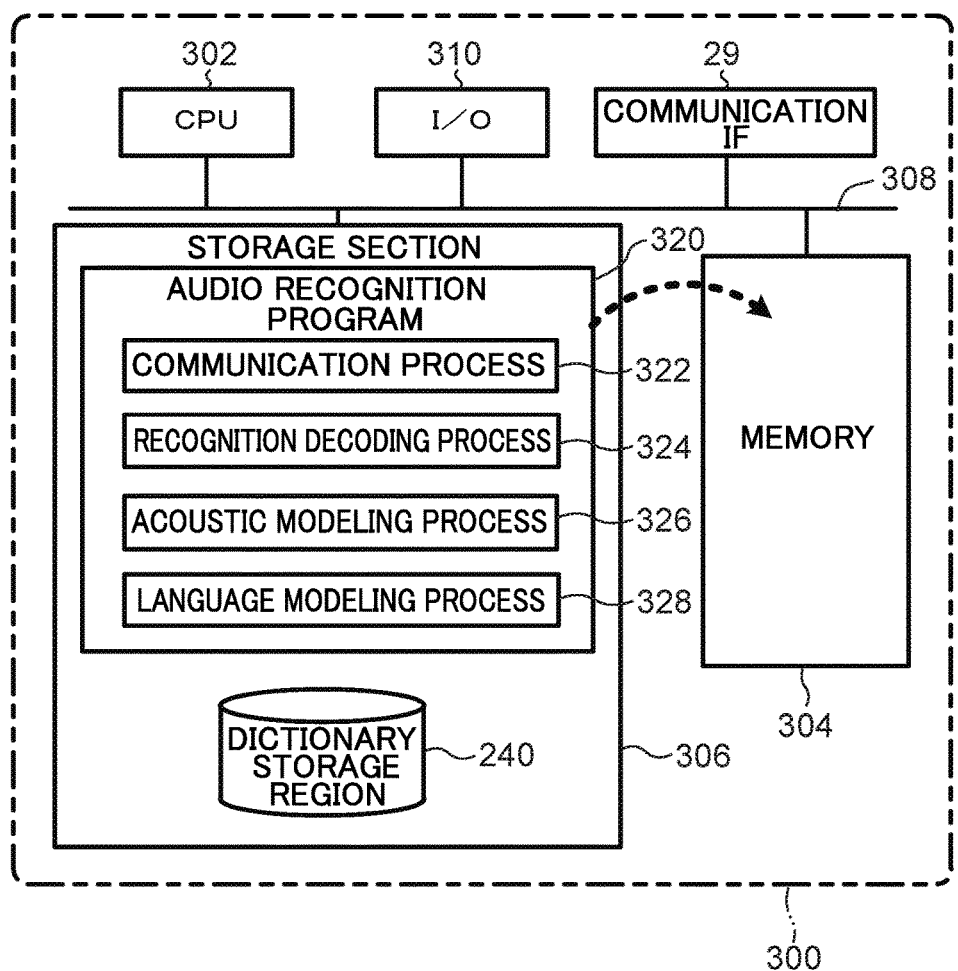
FIG. 30 is a diagram illustrating an example of a configuration when an information processing device is implemented by a computer.

Next, a configuration diagram is illustrated in FIG. 30 for when the information processing device 52 is implemented by a computer.

A computer 300 includes a CPU 302, memory 304, and a non-volatile storage section 306. The CPU 302, the memory 304, and the non-volatile storage section 306 are mutually connected through a bus 308. The computer 300 is provided with a communication IF 29 and an I/O 310, with the communication IF 29 and the I/O 310 connected to the bus 308. Note that the storage section 306 may be implemented by an HDD, flash memory, or the like.

An audio recognition program 320 that causes the computer 300 to function as each of the functional sections of the information processing device 52 illustrated in FIG. 28 is stored in the storage section 306. The audio recognition program 320 stored in the storage section 306 includes a communication process 322, a recognition decoding process 324, an acoustic modeling process 326, and a language modeling process 328.

The CPU 302 reads the audio recognition program 320 from the storage section 306, expands the audio recognition program 320 into the memory 304, and executes each of the processes included in the audio recognition program 320.

The computer 300 operates as each of the functional sections of the information processing device 52 illustrated in FIG. 28 by the CPU 302 reading the audio recognition program 320 from the storage section 306, expanding the audio recognition program 320 into the memory 304, and executing the audio recognition program 320. Specifically, the computer 300 operates as the communication section 54 illustrated in FIG. 28 by the CPU 302 executing the communication process 322. Moreover, the computer 300 operates as the recognition decoder 42 illustrated in FIG. 28 by the CPU 302 executing the recognition decoding process 324. Moreover, the computer 300 operates as the acoustic model section 44 illustrated in FIG. 28 by the CPU 302 executing the acoustic modeling process 326. Moreover, the computer 300 operates as the language model section 48 illustrated in FIG. 28 by the CPU 302 executing the language modeling process 328.

Moreover, the computer 300 includes the dictionary 46 illustrated in FIG. 28 by the CPU 302 expanding dictionary data included in the dictionary storage region 240 into the memory 304.

Note that each of the functional sections of the information processing device 52 may be implemented by, for example, a semiconductor integrated circuit, or more specifically by an ASIC or the like.

Note that other than the device 16 executing audio recognition processing, audio type identification processing, and speech production processing in cooperation with the information processing device 52, the flow of the speech-to-caption processing, situation notification processing, and speech production processing in the device 16 is the same as the flow of each processing as explained above.

For example, the device 16 uses the acoustic analyzer 40 to execute the processing of step S400 from out of the audio recognition processing illustrated in FIG. 7, and notifies the acquired time series data of the acoustic spectrum to the wireless communication section 38. The wireless communication section 38 transmits the time series data of the acoustic spectrum received from the acoustic analyzer 40 via the wireless communication IF 27 to the information processing device 52 over the network 50.

On receipt of the time series data of the acoustic spectrum, the information processing device 52 executes the processing of steps S401 to S406 from out of the audio recognition processing illustrated in FIG. 7. When doing so, at step S406, the recognition decoder 42 notifies the communication section 54 with the speech content of the speaker captioned by the processing of step S404. The communication section 54 then transmits the captioned speech content of the speaker to the sound source location identification section 32 of the device 16 via the communication IF 29.

Similarly, the device 16 uses the acoustic analyzer 40 to execute the processing of step S400 from out of the audio type identification processing illustrated in FIG. 10 and transmits the acquired time series data of the acoustic spectrum to the information processing device 52. On receipt of the time series data of the acoustic spectrum, the information processing device 52 executes the processing of step S408 from out of the audio type identification processing illustrated in FIG. 10 and transmits the type of sound identified from the acoustic spectrum to the device 16.

Moreover, when executing predictive display in the speech production processing, the device 16 transmits to the information processing device 52 the characters identified by the processing of step S120 of FIG. 24 and information about the string of characters selected by the user so far, which was stored in the memory 204 by the processing of step S130. Then, in the language model section 48 of the information processing device 52, candidate words are selected to follow the flow of the context from information about the identified characters and the string of characters so far, and the selected candidate words may be transmitted to the device 16.

The reason for the device 16 performing audio recognition utilizing a cloud service in this manner is that the volume of data processing processed by the device 16 is reduced to less than the volume of data processing processed by the devices 10, 12, and 14.

Due to the presumption that a wearable device, as typified by the device 16 and the like, is used while being worn on the body, there is an underlying need to make the wearable device as light in weight and compact as possible. There is accordingly a tendency for components built into the device, such as the CPU 202, the memory 204, and the like, to use components that are as light in weight and as compact as possible. However, as components are made lighter in weight and more compact, there is often a drop in the performance thereof, such as the processing power, storage capacity, and the like; and there are sometimes limitations to the performance implementable by a device on its own.

Thus, by assigning the recognition decoder 42, the acoustic model section 44, the dictionary 46, and the language model section 48 to the information processing device 52, as illustrated in FIG. 28, the volume of data processing in the device 16 is reduced, enabling a lighter in weight and more compact device 16 to be implemented.

Moreover, due to there being no limitations to the specification, such as the processing performance, weight, size, etc., of the information processing device 52; components with higher performance can be employed in the information processing device 52 than components capable of being built into the device 16, such as the CPU 202, the memory 204, and the like. The quantity of acoustic spectra and words registerable in the dictionary 46 is thereby increased compared to in the devices 10, 12, and 14; and faster audio recognition is enabled. As a result, due to shortening the time taken to identify the type of sound and the direction of emitted sound picked up by the microphones 22, the device 16 is able to shorten the time before icons and captions are displayed compared to the devices 10, 12, and 14. The device 16 is also able to improve the precision of identifying the type of sound and the direction of emitted sound compared to the devices 10, 12, and 14.

Moreover, executing the audio recognition processing of plural devices 16 with the information processing device 52 enables the dictionaries 46 utilized by the plural devices 16 to be updated all at once by, for example, updating the acoustic spectra, words, etc. registered in the dictionary 46 of the information processing device 52.

Note that although an example has been given in which, from out of the configuration elements of the audio recognition section 34 of the fourth exemplary embodiment, the acoustic analyzer 40 remains in the device 16, there is no limitation to how the functional sections remaining in the device 16 and the functional sections transferred to the information processing device 52 are split.

In this manner, the devices 10, 12, 14, or 16 according to each of the exemplary embodiments (referred to below simply as "devices") are able to provide functionality for communication of a person with hearing difficulties with surrounding people through speech-to-caption processing and speech production processing. Moreover, the devices according to each of the exemplary embodiments are also able to provide functionality to ascertain the situation in the vicinity of a person with hearing difficulties through the situation notification processing.

Although explanation has been given above regarding technology disclosed herein by using each of the exemplary embodiments, the technology disclosed herein is not limited to the scope of the description of the respective exemplary embodiments. Various modifications and improvements may be added to each of the exemplary embodiments within a range not departing from the spirit of the technology disclosed herein, and embodiments with such added modifications and improvement are also encompassed by the technological scope of technology disclosed herein. For example, the sequence of processing may be changed within a range not departing from the spirit of the technology disclosed herein.

Moreover, although explanation has been given in each of the embodiments regarding the display control program 220, 220A, and 220B and the audio recognition program 320 being pre-stored (installed) in a storage section, there is no limitation thereto. The display control programs 220, 220A, and 220B and the audio recognition program 320 according to the technology disclosed herein may be provided in a format recorded on a computer readable recording medium. For example, the display control programs 220, 220A, and 220B and the audio recognition program 320 according to technology disclosed herein may be provided in a format recorded on a portable recording medium, such as a CD-ROM, DVD-ROM, USB memory or the like. Moreover, the display control programs 220, 220A, and 220B and the audio recognition program 320 according to technology disclosed herein may be provided in a format recorded on semiconductor memory or the like, such as flash memory.

Note that a camera for imaging images in the vicinity of the user may be attached to the devices according to each of the exemplary embodiments. In such cases, the positions of predetermined objects of conceivable sources of emitted sound, such as people and vehicles, are detected in images imaged by the camera using known image recognition processing. The positions of the source of emitted sound can then be identified by combining the positions of the objects detected in the images of the camera and information about the direction of emitted sound identified from discrepancies in arrival timing of audio signals.

In this manner, due to being able correct to align the direction of emitted sound identified from the discrepancies in arrival timing of audio signals with the positions of such objects, the position of the source of emitted sound can be identified with better precision than in cases in which direction of emitted sound is identified from the discrepancies in arrival timing of audio signals alone.

Conventional wearable devices often presume that the user is an able-bodied person, and it is difficult to say that conventional wearable devices are implementing functionality to actively promote usage by, for example, the hearing impaired.

An aspect of technology disclosed herein enables the provision of a device to assist in ascertaining emitted sounds.

All cited documents, patent applications, and technical standards mentioned in the present specification are incorporated by reference in the present specification to the same extent as if each individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wearable device comprising: a microphone; a display; and a processor configured to execute a process, the process comprising: analyzing sound picked up by the microphone; distinguishing an origin of the sound; determining if the origin of the sound corresponds to a voice of a wearer of the wearable device; if the origin of the sound corresponds to the voice of the wearer, selecting, based on a predetermined setting, between not displaying information corresponding to the voice of the wearer, or displaying information corresponding to the voice of the wearer in a different state than that of a voice other than the wearer's voice, and if the origin of the sound does not correspond to the voice of the wearer, identifying a direction of the sound based on the sound picked up by the microphone and displaying information corresponding to the sound at a position on the display corresponding to the identified direction of the sound; detecting a direction of gaze of the wearer of the wearable device; determining a position on the display that corresponds to a center in a field of view of the wearer of the wearable device according to the direction of detected gaze of the wearer of the wearable device; and correcting the position where the information is displayed such that closer the detected gaze is to the direction of sound, the closer the position where the information is displayed is to the center of the field of view.

2. The wearable device of claim 1, wherein the display is a retinal display or a transmission type display.

3. The wearable device of claim 1, wherein the gaze of the wearer is detected based on a potential difference surrounding an eyeball of the wearer of the wearable device.

4. The wearable device of claim 1, wherein the process further comprises:
displaying an icon or text according to the distinguished origin.

5. The wearable device of claim 4, wherein the origin of the sound is at least one of a person, a vehicle, thunder, or a chime.

6. The wearable device of claim 1, wherein the process further comprises:
wirelessly transmitting information regarding the sound picked up by the microphone; and
displaying an icon or text according to a distinguished origin of the sound, based on emission-origin-distinguishing result information, received as a response to the wireless transmission.

7. The wearable device of claim 1, wherein the process further comprises:
erasing the information displayed on the display or lowering a visibility of the information displayed on the display, based on a period of time elapsed since sound was picked up by the microphone.

8. The wearable device of claim 1, wherein
if the origin of the sound corresponds to the voice of the wearer, either not displaying information corresponding to the voice of the wearer or displaying information corresponding to the voice of the wearer at a fixed position on the display, and
if the origin of the sound does not correspond to the voice of the wearer, identifying a direction of the sound and displaying information corresponding to the sound at a position on the display corresponding to the identified direction of the sound.

9. A display control method in which a computer executes processing comprising: by a processor: analyzing sound picked up by a microphone; distinguishing an origin of the sound; determining if the origin of the sound corresponds to a voice of a wearer of the wearable device; if the origin of the sound corresponds to the voice of the wearer, selecting, based on a predetermined setting, between not displaying information corresponding to the voice of the wearer, or displaying information corresponding to the voice of the wearer in a different state than that of a voice other than the wearer's voice, and if the origin of the sound does not correspond to the voice of the wearer, identifying a direction of the sound based on the sound picked up by a microphone and displaying information corresponding to the sound at a position on a display corresponding to the identified direction of the sound; detecting a direction of gaze of the wearer of a wearable device executing the processing; determining a position of the display that corresponds to a center in a field of view of the wearer of the wearable device according to the direction of detected gaze of the wearer of the wearable device; and correcting a position where the information is displayed such that closer the detected gaze is to the direction of sound, the closer the position where the information is displayed is to the center of the field of view.

10. The display control method of claim 9, wherein:
the display is a retinal display or a transmission type display.

11. The display control method of claim 9, wherein the gaze of the wearer of the device executing the processing is detected based on a potential difference surrounding an eyeball of the wearer.

12. The display control method of claim 9, further comprising:
by the processor:
displaying an icon or text according to the distinguished origin.

13. The display control method of claim 12, wherein the origin of the sound is at least one of a person, a vehicle, thunder, or a chime.

14. The display control method of claim 9, further comprising:
by the processor:
wirelessly transmitting information regarding the sound picked up by the microphone; and
displaying an icon or text according to a distinguished origin of the sound based on emission-origin-distinguishing result information, received as a response to the wireless transmission.

15. The display control method of claim 9, further comprising:
by the processor, erasing the information displayed on the display or lowering a visibility of the information displayed on the display based on a period of time elapsed since sound was picked up by the microphone.

16. A non-transitory computer-readable recording medium storing a display control program that causes a computer to execute a process, the process comprising: analyzing sound picked up by a microphone; distinguishing an origin of sound; determining if the origin of the sound corresponds to a voice of a wearer of the wearable device; if the origin of the sound corresponds to the voice of the wearer, selecting, based on a predetermined setting, between not displaying information corresponding to the voice of the wearer, or displaying information corresponding to the voice of the wearer in a different state than that of a voice other than the wearer's voice, and if the origin of the sound does not correspond to the voice of the wearer, identifying a direction of the sound based on the sound picked up by a microphone and displaying information corresponding to the sound at a position on a display corresponding to the identified direction of the sound; detecting a direction of gaze of the wearer of a wearable device executing the process; determining a position on the display that corresponds to a center in a field of view of the wearer of the wearable device according to the direction of detected gaze of the wearer of the wearable device; and correcting a position where the information is displayed such that closer the detected gaze is to the direction of sound, the closer the position where the information is displayed is to the center of the field of view.

17. The computer-readable recording medium of claim 16, wherein:
the display is a retinal display or a transmission type display.

* * * * *